(12) United States Patent
Yu

(10) Patent No.: US 11,528,488 B2
(45) Date of Patent: Dec. 13, 2022

(54) IMAGE AND VIDEO DATA PROCESSING METHOD AND SYSTEM

(71) Applicant: Jianghong Yu, Beijing (CN)

(72) Inventor: Jianghong Yu, Beijing (CN)

(73) Assignee: Jianghong Yu, Beijing (CN)

(*) Notice: Subject to any disclaimer, the term of this patent is extended or adjusted under 35 U.S.C. 154(b) by 0 days.

(21) Appl. No.: 17/324,103

(22) Filed: May 19, 2021

(65) Prior Publication Data

US 2021/0321119 A1     Oct. 14, 2021

Related U.S. Application Data

(63) Continuation-in-part of application No. 17/086,407, filed on Nov. 1, 2020, now Pat. No. 11,064,207.

(30) Foreign Application Priority Data

Apr. 9, 2020 (CN) .......................... 202010276253.7
Jun. 5, 2020 (CN) .......................... 202010504349.4

(51) Int. Cl.
    *H04N 19/105*     (2014.01)
    *H04N 19/159*     (2014.01)
    (Continued)

(52) U.S. Cl.
    CPC ......... *H04N 19/167* (2014.11); *H04N 19/105* (2014.11); *H04N 19/159* (2014.11); *H04N 19/172* (2014.11)

(58) Field of Classification Search
None
See application file for complete search history.

(56) References Cited

U.S. PATENT DOCUMENTS

| | | | | |
|---|---|---|---|---|
| 4,918,532 A | * | 4/1990 | O'Connor | H04N 5/455 455/208 |
| 2014/0219329 A1 | * | 8/2014 | Seller | H03M 5/14 375/240 |

(Continued)

FOREIGN PATENT DOCUMENTS

| | | |
|---|---|---|
| CN | 1922887 A | 2/2007 |
| CN | 101197576 A | 6/2008 |

(Continued)

OTHER PUBLICATIONS

International Search Report of PCT/CN2021/083839 (dated Jun. 29, 2021).

*Primary Examiner* — Mohammad J Rahman
(74) *Attorney, Agent, or Firm* — Fideli Law PLLC

(57) ABSTRACT

A data processing method and system provided in this disclosure perform decoding spectrum modulation on the compressed data by using a decoding convolution kernel and perform a boundary adjustment, where the decoding convolution kernel corresponds to an encoding convolution kernel in data compression, so that an amplitude of decompressed data in a low-frequency to intermediate-frequency region is approximately equal to, or greater than or equal to an amplitude of an original frame, and the boundary adjustment can effectively eliminate a ringing effect after the decoding spectrum modulation and make the decompressed data clearer. The method and system can improve data compression efficiency, and improve transmission efficiency, while improving definition of the decompressed data.

20 Claims, 12 Drawing Sheets

(51) Int. Cl.
*H04N 19/167* (2014.01)
*H04N 19/172* (2014.01)

(56) References Cited

U.S. PATENT DOCUMENTS

| | | |
|---|---|---|
| 2015/0131748 A1 | 5/2015 | Ono et al. |
| 2015/0373369 A1* | 12/2015 | Jalali .................... H04N 19/136 375/240.12 |
| 2017/0332074 A1 | 11/2017 | Zhang et al. |
| 2018/0144754 A1* | 5/2018 | Peng .................. H04N 21/8358 |

FOREIGN PATENT DOCUMENTS

| | | |
|---|---|---|
| CN | 104751850 A | 7/2015 |
| CN | 104967850 A | 10/2015 |
| CN | 107105257 A | 8/2017 |

\* cited by examiner

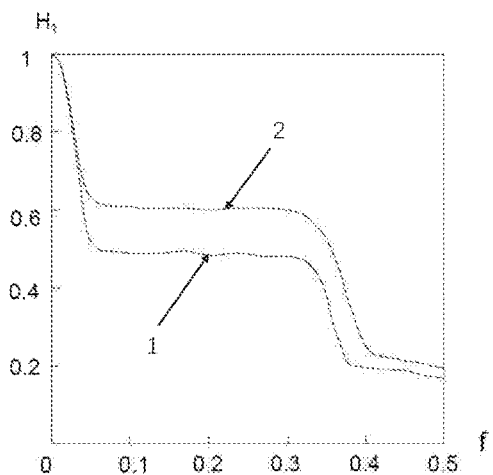
FIG. 5A
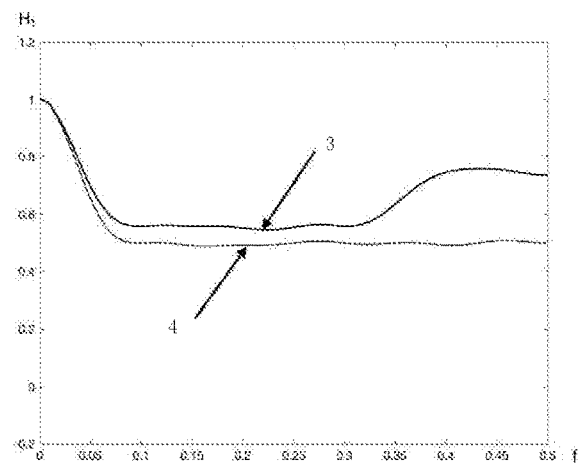
FIG. 5B
| 5 | 1 | 1 | 6 | 8 | 6 | 1 | 9 | 23 | 136 | 23 | 9 | 1 | 6 | 8 | 6 | 1 | 1 | 5 |
FIG. 6

| -11 | -6 | 12 | -9 | -31 | -8 | 32 | -70 | -2 | 186 | -2 | -70 | 32 | -8 | -31 | -9 | 12 | -6 | -11 |

| -14 | -3 | 10 | -9 | -28 | -11 | 54 | -102 | -22 | 250 | -22 | -102 | 54 | -11 | -28 | -9 | 10 | -3 | -14 |

140

IMAGE AND VIDEO DATA PROCESSING METHOD AND SYSTEM

RELATED APPLICATIONS

This application claims the benefit of priority to Chinese Patent Application No. 202010504349.4, filed on Jun. 5, 2020. This application also is a continuation-in-part of U.S. application Ser. No. 17/086,407, filed on Nov. 1, 2020, which claimed the benefit of priority to Chinese Patent Application No. 202010276253.7, filed on Apr. 9, 2020, and the contents of the foregoing documents are incorporated herein by reference in their entirety.

TECHNICAL FIELD

This disclosure relates to the data processing field, and in particular, to a data processing method and system.

BACKGROUND

As Internet technologies are increasingly popularized, and in particular, as mobile terminals are popularized, there are more types of data in a communications network. However, with popularity of computers, more data, such as video data and audio data, is occupying more network resources and storage resources. The data usually contains a huge amount of information, often having high requirements on storage and transmission. For ease of storage and transmission, the data is usually compressed, and when needed, the data is restored through decompression of the compressed data. Therefore, data compression and decompression technologies have more applications.

For example, video and image compression technologies have seen more and more applications in the past several decades. A video usually contains a huge amount of information. From the traditional radio, film, and television to current multitudinous surveillance and Internet applications, compressed videos and images are occupying more network resources and storage resources. Therefore, when original data of a video is transmitted from one terminal to another terminal through a network, a lot of network resources will be occupied. As a result, it is difficult to have smooth transmission of images in some scenarios of real-time video transmission. Therefore, before video data is transmitted, a data compression device needs to perform compression processing on the video data first to facilitate transmission. After the compressed video is transmitted to a data decompression device through a transmission medium, the data decompression device then decompresses the video to at least partially restore video images.

The main existing video compression standards include the Recommendation ITU-T H.264/H.265. Before transmission, a video is generally subjected to global compression by an encoder according to the Recommendation ITU-T H.264/H.265, and then after transmission, the compressed data is subjected to global decompression by a decoder according to the Recommendation ITU-T H.264/H.265. However, due to the following reasons, performance of the foregoing processing method for global compression of the video is still not satisfactory in terms of balancing between an amount of calculation and the definition of the decompressed video. When processing the original video, according to the Recommendation ITU-T H.264/H.265, various complex algorithms need to be used to generate a predictive frame of an original frame, and then a residual between the original frame and the predictive frame is recorded. The closer the predictive frame to the original frame, the smaller the residual, and the smaller the amount of data in an encoded video. To make the encoding easier, a commonly used method is to reduce high-frequency information in the original frame image by filtering the original frame. According to a Fourier transform, it may be known that frequency information of a boundary part of an object in an image is often relatively rich and that a high-frequency component of the boundary part is usually larger than those in flat regions. Therefore, although the frame image with reduced high-frequency information becomes visually blurred (that is, the sharpness of the image is reduced), the residual between the predictive frame and the filtered original frame can be made smaller. In this way, an amount of calculation required for video encoding and an encoded data stream are both greatly reduced. However, a frame prediction technology is complex and may consume a lot of computing resources. Taking a video codec system as an example, an average increase in encoding efficiency by 30% to 40% may require an increase in the amount of calculation by approximately 10 times. In addition, after data transmission and decompression, the definition is reduced, and a ringing effect usually exists. Therefore, growing requirements of people on data definition cannot be satisfied. Therefore, how to further improve data compression efficiency while improving definition of decompressed data has become a goal pursued in the field of data compression and decompression technologies.

Therefore, to improve data transmission efficiency and definition of decompressed data, a data processing method and system having higher compression efficiency and higher definition of decompressed data are needed.

SUMMARY

This disclosure provides a data processing method and system having higher compression efficiency and higher definition of decompressed data. The data processing method and system include a data encoder and decoder. Using video data as an example, when compressing original video data, the encoder may perform encoding spectrum modulation on an original frame in the original video data to reduce signal strength of the original frame in a selected frequency region, thereby reducing an amount of data information. For example, the encoding spectrum modulation can smoothly decrease an amplitude of the original frame in the selected region, thereby reducing an amount of data information in the original frame. Then the encoder encodes spectrum-modulated data to obtain a compressed frame. In the method and system, when decompressing the compressed frame, the decoder may first decode the compressed frame, and then use parameters corresponding to those of the encoder to perform decoding spectrum modulation and a boundary adjustment on the decoded compressed frame, so that definition of decompressed data is restored to definition of the original frame or is even higher than definition of the original frame. In a salient frequency region, the original frame undergoes only signal attenuation in a frequency domain rather than filtering in the frequency domain, and information in the salient frequency region is not lost. Therefore, the corresponding decoding spectrum modulation can be designed based on the encoding spectrum modulation, to restore the information of the original frame at the salient frequency. In other words, without significantly increasing an amount of codec calculation, the decoder can at least restore definition of data at the salient frequency in the decompressed data to the definition of the original frame, or can even obtain definition higher than that of the original frame. In addition, the boundary adjustment performed on the decompressed data can effectively improve the definition of the data and reduce a ringing effect. The method and system can significantly improve data compression efficiency and improve data transmission efficiency, while improving the definition of the decompressed data.

To this end, according to a first aspect, this disclosure provides a system, including: at least one storage medium, including at least a set of instructions for data processing; and at least one processor in communication with the at least one storage medium, where during operation the at least one processor executes the set of instructions to: obtain compressed data, the compressed data including a compressed frame obtained by performing data compression on an original frame, where the compressed frame includes compressed predictive data and residual data, and the data compression includes encoding spectrum modulation; and perform data decompression on the compressed frame to obtain a decompressed frame, including: perform decoding spectrum modulation and a boundary adjustment on an under-decompression-frame to obtain the decompressed frame, where: the under-decompression-frame includes any frame of the compressed frame as well as the compressed frame in any data state during the performing of data decompression before obtaining the decompressed frame based on the predictive data and the residual data, and the decoding spectrum modulation is related to the encoding spectrum modulation, so that an amplitude of the decompressed frame at any frequency in a region from low-frequency to intermediate-frequency is not less than a preset percentage of an amplitude of the original frame in a corresponding frequency in the region from low-frequency region to intermediate-frequency.

In some exemplary embodiments, the decoding spectrum modulation corresponds to the encoding spectrum modulation, so that the amplitude of the decompressed frame in a region of intermediate-frequency is smoothly increased in comparison with the corresponding amplitude of the original frame in the region of intermediate-frequency.

In some exemplary embodiments, the decoding spectrum modulation corresponds to the encoding spectrum modulation, so that the amplitude of the decompressed frame in a region of low-frequency is smoothly increased in comparison with the corresponding amplitude of the original frame in the region of low-frequency, and the increase of the amplitude of the decompressed frame in the region of intermediate-frequency is greater than the increase of the amplitude of the decompressed frame in the region of low-frequency.

In some exemplary embodiments, the decoding spectrum modulation corresponds to the encoding spectrum modulation, so that the amplitude of the decompressed frame in a region of high-frequency is smoothly decreased in comparison with the corresponding amplitude of the original frame in the region of high-frequency.

In some exemplary embodiments, to perform the data decompression on the compressed frame, the at least one processor further execute the set of instructions to: decode the compressed frame based on the predictive data and the residual data to obtain a decoded frame, where the under-decompression-frame includes the decoded frame; perform the decoding spectrum modulation on the decoded frame to obtain an adjustment frame; and perform a boundary adjustment on the adjustment frame to obtain the decompressed frame.

In some exemplary embodiments, to perform the decoding spectrum modulation on the decoded frame, the at least one processor further execute the set of instructions to: determine a frame type of the decoded frame, where the frame type includes at least one of an intra predictive frame, a forward predictive frame, or a bidirectional predictive frame; obtain a decoding convolution kernel based on the frame type of the decoded frame to convolve the decoded frame; obtain a compensation frame based on the convolution result, where the compensation frame is a compensation for the decoded frame, and the compensation frame and the decoded frame are complementary to each other; and superimpose the compensation frame on the decoded frame to obtain the adjustment frame.

In some exemplary embodiments, when the decoded frame is the bidirectional predictive frame: the decoding convolution kernel corresponding to the decoded frame is the same as a decoding convolution kernel corresponding to a reference frame with highest attenuation among closest adjacent reference frames in two directions, or the decoding convolution kernel corresponding to the decoded frame is an average value of decoding convolution kernels corresponding to closest adjacent reference frames in two directions.

According to a second aspect, this disclosure provides a data processing method, including: obtaining compressed data, the compressed data including a compressed frame obtained by performing data compression on an original frame, where the compressed frame includes compressed predictive data and residual data, and the data compression includes encoding spectrum modulation; and performing data decompression on the compressed frame to obtain a decompressed frame, including: performing decoding spectrum modulation and a boundary adjustment on an under-decompression-frame to obtain the decompressed frame, where: the under-decompression-frame includes any frame of the compressed frame as well as the compressed frame in any data state during the performing of data decompression before obtaining the decompressed frame based on the predictive data and the residual data, and the decoding spectrum modulation is related to the encoding spectrum modulation, so that an amplitude of the decompressed frame at any frequency in a region from low-frequency to intermediate-frequency is not less than a preset percentage of an amplitude of the original frame in a corresponding frequency in the region from low-frequency region to intermediate-frequency.

In some exemplary embodiments, the decoding spectrum modulation corresponds to the encoding spectrum modulation, so that the amplitude of the decompressed frame in a region of intermediate-frequency is smoothly increased in comparison with the corresponding amplitude of the original frame in the region of intermediate-frequency.

In some exemplary embodiments, the decoding spectrum modulation corresponds to the encoding spectrum modulation, so that the amplitude of the decompressed frame in a region of low-frequency is smoothly increased in comparison with the corresponding amplitude of the original frame in the region of low-frequency, and the increase of the amplitude of the decompressed frame in the region of intermediate-frequency is greater than the increase of the amplitude of the decompressed frame in the region of low-frequency.

In some exemplary embodiments, the decoding spectrum modulation corresponds to the encoding spectrum modulation, so that the amplitude of the decompressed frame in a region of high-frequency is smoothly decreased in comparison with the corresponding amplitude of the original frame in the region of high-frequency.

In some exemplary embodiments, the performing of the data decompression on the compressed frame includes: decoding the compressed frame based on the predictive data and the residual data to obtain a decoded frame, where the under-decompression-frame includes the decoded frame; performing the decoding spectrum modulation on the decoded frame to obtain an adjustment frame; and performing a boundary adjustment on the adjustment frame to obtain the decompressed frame.

In some exemplary embodiments, the performing of the decoding spectrum modulation on the decoded frame includes: determining a frame type of the decoded frame, where the frame type includes at least one of an intra predictive frame, a forward predictive frame, or a bidirectional predictive frame; obtaining a decoding convolution kernel based on the frame type of the decoded frame to convolve the decoded frame; and obtaining the adjustment frame based on a convolution result, including: obtaining a compensation frame based on the convolution result, where the compensation frame is a compensation for the decoded frame, and the compensation frame and the decoded frame are complementary to each other, and superimposing the compensation frame on the decoded frame to obtain the adjustment frame.

In some exemplary embodiments, when the decoded frame is the bidirectional predictive frame: the decoding convolution kernel corresponding to the decoded frame is the same as a decoding convolution kernel corresponding to a reference frame with highest attenuation among closest adjacent reference frames in two directions, or the decoding convolution kernel corresponding to the decoded frame is an average value of decoding convolution kernels corresponding to closest adjacent reference frames in two directions.

In some exemplary embodiments, the performing of the boundary adjustment on the adjustment frame includes: partitioning the adjustment frame based on element values of the adjustment frame, where the adjustment frame includes: a pitted region including an element corresponding to a local minimum value, and a salient region including an element corresponding to a local maximum value; obtaining a boundary value corresponding to each element in the pitted region and the salient region in the adjustment frame; adjusting, based on a preset boundary threshold, an element whose boundary value is greater than the boundary threshold, in the pitted region and the salient region, to obtain an adjustment value; and adjusting the adjustment frame based on the adjustment value to obtain the decompressed frame.

In some exemplary embodiments, the boundary value includes a combination of a forward differential HADVD (Higher Absolute Differential Value Difference) and a backward differential HADVD of a current element; and a direction of the forward differential HADVD and the backward differential HADVD includes at least one of a vertical direction, a horizontal direction, or an oblique direction, and is the same as a convolution direction of the decoded frame.

In some exemplary embodiments, the combination of the forward differential HADVD and the backward differential HADVD of the current element includes: a maximum weighted value, being a weighted value of a maximum value of the forward differential HADVD and the backward differential HADVD of the current element; or an absolute difference, being an absolute value of a difference between the forward differential HADVD and the backward differential HADVD of the current element.

In some exemplary embodiments, the adjusting, based on the preset boundary threshold, of the element whose boundary value is greater than the boundary threshold, in the pitted region and the salient region, to obtain the adjustment value includes: performing finite-order linear combining on a ratio of the boundary value corresponding to the element in the pitted region to the boundary threshold to obtain an adjustment value of the pitted region; and performing finite-order linear combining on a ratio of the boundary value corresponding to the element in the salient region to the boundary threshold, and negating a result of the finite-order linear combining to obtain an adjustment value of the salient region.

In some exemplary embodiments, the adjusting of the adjustment frame based on the adjustment value includes: superimposing the adjustment value on the element value corresponding to the adjustment frame.

In some exemplary embodiments, the data processing method further includes, prior to the partitioning of the adjustment frame based on the element values of the adjustment frame: assigning values to elements whose element values are beyond a preset range in the adjustment frame, so that the elements are within the preset range, where the preset range includes a range defined by a first critical value and a second critical value, and the first critical value is greater than the second critical value, including: assigning the first critical value to an element whose element value is greater than the first critical value in the adjustment frame, and assigning the second critical value to an element whose element value is less than the second critical value in the adjustment frame.

Other functions of the data processing method and system provided in this disclosure are partially listed in the following description. Based on the description, content described in the following figures and examples is obvious to a person of ordinary skill in the art. The inventive aspects of the data processing method and system and storage medium provided in this disclosure may be fully explained by practicing or using the method, apparatus, and a combination thereof in the following detailed examples.

BRIEF DESCRIPTION OF DRAWINGS

To clearly describe the technical solutions in the embodiments of this disclosure, the following briefly describes the accompanying drawings required for describing the embodiments. Apparently, the accompanying drawings in the following description show merely some exemplary embodiments of this disclosure, and a person of ordinary skill in the art may still derive other drawings from these accompanying drawings without creative efforts.

FIG. 5A is a graph of an encoding spectrum modulation function according to some exemplary embodiments of this disclosure;

FIG. 5B is a graph of an encoding spectrum modulation function according to some exemplary embodiments of this disclosure;

FIG. 6 is a parameter table of an encoding convolution kernel according to some exemplary embodiments of this disclosure;

DETAILED DESCRIPTION

The following description provides specific application scenarios and requirements of this disclosure, to enable a person skilled in the art to make and use contents of this disclosure. Various partial modifications to the disclosed exemplary embodiments are obvious to a person skilled in the art. General principles defined herein can be applied to other embodiments and applications without departing from the scope of this disclosure. Therefore, this disclosure is not limited to the illustrated exemplary embodiments, but is to be accorded the widest scope consistent with the claims.

The terms used herein are only intended to describe specific exemplary embodiments and are not restrictive. As used herein, singular forms "a", "an", and "the" may also include plural forms, unless otherwise clearly indicated in a context. When used in this disclosure, the terms "comprising", "including", and/or "containing" indicate presence of associated integers, steps, operations, elements, and/or components, yet do not preclude presence of one or more other features, integers, steps, operations, elements, components, and/or groups thereof or addition of other features, integers, steps, operations, elements, components, and/or groups thereof to the system/method.

In view of the following description, these features and other features of this disclosure, operations and functions of related elements of structures, and economic efficiency in combining and manufacturing components can be significantly improved. All of these constitute part of this disclosure with reference to the drawings. However, it should be understood that the drawings are only for illustration and description purposes and are not intended to limit the scope of this disclosure. It should also be understood that the drawings are not drawn to scale.

Flowcharts used in this disclosure show operations implemented by the system according to some exemplary embodiments of this disclosure. It should be understood that operations in the flowcharts may be implemented in a different order. The operations may be implemented in a reverse order or simultaneously. In addition, one or more other operations may be added to the flowcharts, and one or more operations may be removed from the flowcharts.

In a first aspect, this disclosure provides a data processing system 100 (hereinafter referred to as the system 100). In a second aspect, this disclosure describes a data processing method P200 for compressing data. In a third aspect, this disclosure describes a data processing method P300 for decompressing a compressed frame.

Figure 1:
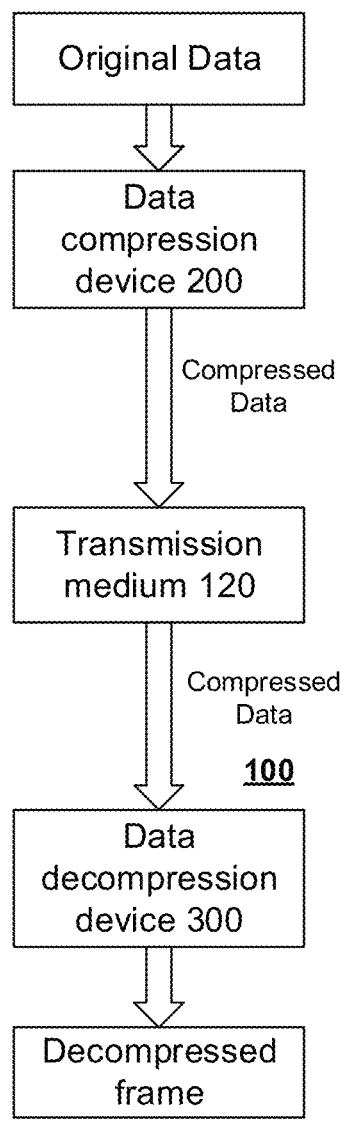
FIG. 1 is a schematic diagram of a data processing system according to some exemplary embodiments of this disclosure.

FIG. 1 is a schematic diagram of the data processing system 100. The system 100 may include a data compression device 200, a data decompression device 300, and a transmission medium 120.

The data compression device 200 may receive original data to be compressed, and compress the original data by using the data processing method P200 provided in this disclosure, to generate a compressed frame. The data compression device 200 may store data or an instruction(s) for performing the data processing method P200 described in this disclosure, and execute the data and/or the instruction.

The data decompression device 300 may receive the compressed frame, and decompress the compressed frame by using the data processing method P300 provided in this disclosure, to obtain a decompressed frame. The data decompression device 300 may store data or an instruction(s) for performing the data processing method P300 described in this disclosure, and execute the data and/or the instruction.

The data compression device 200 and the data decompression device 300 may include a wide range of apparatuses. For example, the data compression device 200 and the data decompression device 300 may include desktop computers, mobile computing apparatuses, notebook computers (for example, laptop computers), tablet computers, set top boxes, smartphones, and other handheld devices, televisions, cameras, display apparatuses, digital media players, video game consoles, in-vehicle computers, or the like.

As shown in FIG. 1, the data compression device 200 and the data decompression device 300 may be connected by the transmission medium 120. The transmission medium 120 may facilitate transmission of information and/or data. The transmission medium 120 may be any data carrier that can transmit a compressed frame from the data compression device 200 to the data decompression device 300. For example, the transmission medium 120 may be a storage medium (for example, an optical disc), or a wired or wireless communications medium. The communications medium may be a network. In some exemplary embodiments, the transmission medium 120 may be any type of wired or wireless network, or may be a combination thereof. For example, the transmission medium 120 may include a cable network, a wired network, an optical fiber network, a telecommunications network, an intranet, the Internet, a local area network (LAN), a wide area network (WAN), a wireless local area network (WLAN), a metropolitan area network (MAN), a wide area network (WAN), a public switched telephone network (PSTN), a Bluetooth network, a ZigBee network, a near field communication (NFC) network, or the like. One or more components in the data decompression device 300 and the data compression device 200 may be connected to the transmission medium 120 to transmit data and/or information. The transmission medium 120 may include a router, a switch, a base station, or another device that facilitates communication from the data compression device 200 to the data decompression device 300. In some exemplary embodiments, the transmission medium 120 may be a storage medium, such as a mass memory, a removable memory, a volatile read-write memory, a read-only memory (ROM), or the like, or any combination thereof. Exemplary mass memories may include non-transitory storage media, such as magnetic disks, optical discs, and solid-state drives. Removable memories may include flash drives, floppy disks, optical discs, memory cards, zip magnetic disks, magnetic tapes, and the like. A typical volatile read-write memory may include a random access memory (RAM). The RAM may include a dynamic RAM (DRAM), a double data rate synchronous dynamic RAM (DDR SDRAM), a static RAM (SRAM), a thyristor RAM (T-RAM), a zero-capacitance RAM (Z-RAM), or the like. The ROM may include a mask ROM (MROM), a programmable ROM (PROM), a programmable erasable ROM (PEROM), an electrically erasable programmable ROM (EEPROM), an optical disc (CD-ROM), a digital versatile disc ROM, or the like. In some exemplary embodiments, the transmission medium 120 may be a cloud platform. For example, the cloud platform may include a private cloud, a public cloud, a hybrid cloud, a community cloud, a distributed cloud, an inter-cloud cloud, or the like, or any combination thereof.

As shown in FIG. 1, the data compression device 200 may receive original data, and execute an instruction of the data processing method P200 described in this disclosure to perform data compression on the original data to generate a compressed frame, where the compressed frame may be transmitted to the data decompression device 300 through the transmission medium 120; and the data decompression device 300 may execute an instruction(s) of the data processing method P300 described in this disclosure to perform data decompression on the compressed frame to obtain a decompressed frame.

Figure 2:
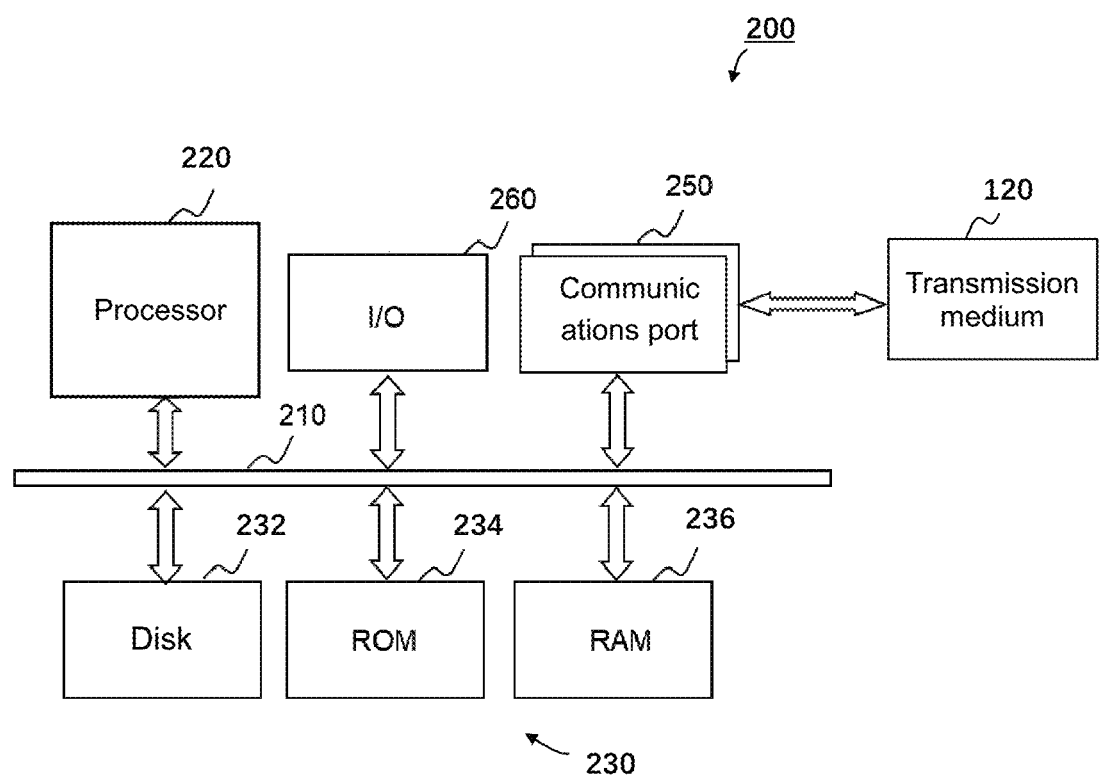
FIG. 2 is a schematic diagram of a data compression device for data processing according to some exemplary embodiments of this disclosure.

FIG. 2 is a schematic diagram of the data compression device 200 for data processing. The data compression device 200 may perform the data processing method P200 described in this disclosure. The data processing method P200 is described in other parts of this disclosure. For example, the data processing method P200 is described in the descriptions of FIG. 4 to FIG. 6.

As shown in FIG. 2, the data compression device 200 may include at least one storage medium 230 and at least one compression processor 220. In some exemplary embodiments, the data compression device 200 may further include a communications port 250 and an internal communications bus 210. In addition, the data compression device 200 may further include an I/O component 260.

The internal communications bus 210 may connect different system components, including the storage medium 230 and the compression processor 220.

The I/O component 260 supports input/output between the data compression device 200 and another component.

The storage medium 230 may include a data storage apparatus. The data storage apparatus may be a non-transitory storage medium, or may be a transitory storage medium. For example, the data storage apparatus may include one or more of a magnetic disk 232, a read-only memory (ROM) 234, or a random access memory (RAM) 236. The storage medium 230 may further include at least one instruction set stored in the data storage apparatus. The instruction set may be computer program code, and the computer program code may include a program, a routine, an object, a component, a data structure, a process, a module, and the like for performing the data processing method provided in this disclosure.

The communications port 250 may be used by the data compression device 200 to perform external data communications. For example, the data compression device 200 may be connected to the transmission medium 120 through the communications port 250.

The at least one compression processor 220 may be in communication with the at least one storage medium 230 through the internal communications bus 210. The at least one compression processor 220 may be configured to execute the at least one instruction set. When the system 100 is in operation, the at least one compression processor 220 reads the at least one instruction set, and performs the data processing method P200 based on the at least one instruction set. The compression processor 220 may perform all steps included in the data processing method P200. The compression processor 220 may be in a form of one or more processors. In some exemplary embodiments, the compression processor 220 may include one or more hardware processors, for example, a microcontroller, a microprocessor, a reduced instruction set computer (RISC), an application-specific integrated circuit (ASIC), an application-specific instruction set processor (ASIP), a central processing unit (CPU), a graphics processing unit (GPU), a physical processing unit (PPU), a microcontroller unit, a digital signal processor (DSP), a field programmable gate array (FPGA), an advanced RISC machine (ARM), a programmable logic device (PLD), another type of circuit or processor that can perform one or more functions, and the like, or any combination thereof. For a purpose of description, only one compression processor 220 is described in the data compression device 200 in this disclosure. However, it should be noted that the data compression device 200 in this disclosure may further include a plurality of processors. Therefore, the operations and/or method steps disclosed in this disclosure may be performed by one processor in this disclosure, or may be performed jointly by a plurality of processors. For example, if the compression processor 220 of the data compression device 200 in this disclosure performs step A and step B, it should be understood that step A and step B may also be performed jointly or separately by two different compression processors 220 (for example, the first processor performs step A, and the second processor performs step B, or the first processor and the second processor jointly perform step A and step B).

Although the data compression device 200 is described in the foregoing structure, such a structure is also applicable to the data decompression device 300. The data decompression device 300 may perform the data processing method P300 described in this disclosure. The data processing method P300 is described in other parts of this disclosure. For example, the data processing method P300 is described in the descriptions of FIG. 7 to FIG. 12.

The data processing methods P200 and P300 and the system 100 may be used for data compression and decompression to improve the data transmission efficiency and save resources and spaces. The data may be non-real-time data or real-time data. From the traditional radio, film, and television to current multitudinous surveillance and Internet applications, there are various types of data. For example, the data may be non-real-time video data, audio data, or image data. The data may also be real-time map data, real-time sensor data, real-time video surveillance data, network monitoring data, meteorological data, aerospace data, or the like. For example, the data may be map data received from a base station by an autonomous vehicle during driving. The specific type of the data is not limited in this disclosure. In this disclosure, methods and steps used for processing different types of data by the data processing methods and system are consistent. For ease of presentation, video data processing is used as an example for description in this disclosure.

The data processing methods P200 and P300 and the system 100 may significantly improve compression efficiency of video data, and improve video transmission efficiency and video restoration ratio. In a traditional video compression technology, the Recommendation ITU-T H.264/H.265 are usually used to encode video data in order to compress the video data. A technical method mainly used by the Recommendation ITU-T H.264/H.265 to encode the video data is predictive coding. To be specific, prediction may be performed on an original frame to obtain a predictive value, and then the predictive value is subtracted from an original value of the original frame to obtain a residual value, thereby compressing the video data. During restoration and decompression (that is, decoding), the original frame may be restored by adding the residual value to the predictive value. The data processing method P200 may use a combination of encoding spectrum modulation and encoding to perform data compression on the video data to obtain a compressed frame, so as to further improve a compression ratio of the video data and the efficiency of video transmission. The data processing method P300 may use a combination of decoding (that is, restoring an under-compression-frame based on a residual value and a predictive value) and decoding spectrum modulation to perform data decompression on the compressed frame to restore the data in the compressed frame. In addition, the data processing method P300 may perform a boundary adjustment on decompressed data, so that the decompressed data is clearer (e.g., for an image data, the image is clearer), thereby effectively eliminating a ringing effect. The encoding spectrum modulation refers to modulating an amplitude of a spectrum of the data to be processed. For example, the encoding spectrum modulation may perform amplitude attenuation on the data to be processed in a frequency domain, thereby reducing an amount of information in the data to be processed, for example, attenuate an amplitude of the data to be processed in a selected frequency region in a frequency domain, such as an amplitude in an intermediate-frequency region, or an amplitude in an intermediate-frequency to high-frequency region. A person of ordinary skill in the art may understand that a frequency component of the data that has undergone the encoding spectrum modulation in the selected frequency region becomes smaller, and thus the amount of information in the data is reduced. Therefore, efficiency of encoding the data that has undergone the encoding spectrum modulation may be improved and the compression ratio may also be improved. The decoding spectrum modulation may allow the data that has undergone the encoding spectrum modulation to be completely restored or approximately restored to a state before the encoding spectrum modulation without considering calculation errors, or even to exceed a state before the encoding spectrum modulation. The boundary adjustment eliminates the ringing effect of the decompressed data, so that the decompressed data is clearer. Therefore, the data processing methods P200 and P300 and the system 100 may significantly improve the compression efficiency of the video data, and improve the video transmission efficiency, the video restoration ratio, and definition of the decompressed video. Specific processes of the encoding spectrum modulation and the decoding spectrum modulation will be described in detail in the subsequent description. When the system 100 performs data compression on the video data, the encoding spectrum modulation and the encoding may be performed alternately or in different orders. Likewise, when the system 100 performs the data decompression on the compressed frame, the decoding spectrum modulation and the decoding may be performed alternately or in different orders. It should be noted that, to ensure that decompressed data information can be restored to the information in the original data, the order of the data decompression should correspond to the order of the data compression, that is, the data decompression may be performed in a reverse order with respect to the data compression. For example, if a compressed frame is obtained by performing the encoding spectrum modulation before the encoding, the compressed frame should be subjected to the decoding and then the decoding spectrum modulation during the data decompression. For ease of description, the original data prior to data compression processing is defined as $P_0$, the decompressed frame obtained through decompression by the data decompression device 300 is defined as $P_4$, data of the decompressed frame prior to the boundary adjustment performed by an adjustment module is referred to as an adjustment frame, and the adjustment frame is defined as $P_3$. An encoding spectrum modulation function corresponding to the encoding spectrum modulation is defined as $H_1(f)$, a decoding spectrum modulation function corresponding to the decoding spectrum modulation is defined as $H_2(f)$, and a transfer function between the adjustment frame $P_3$ and the original data $P_0$ is defined as a global spectrum modulation function $H_0(f)$.

Figure 3B:
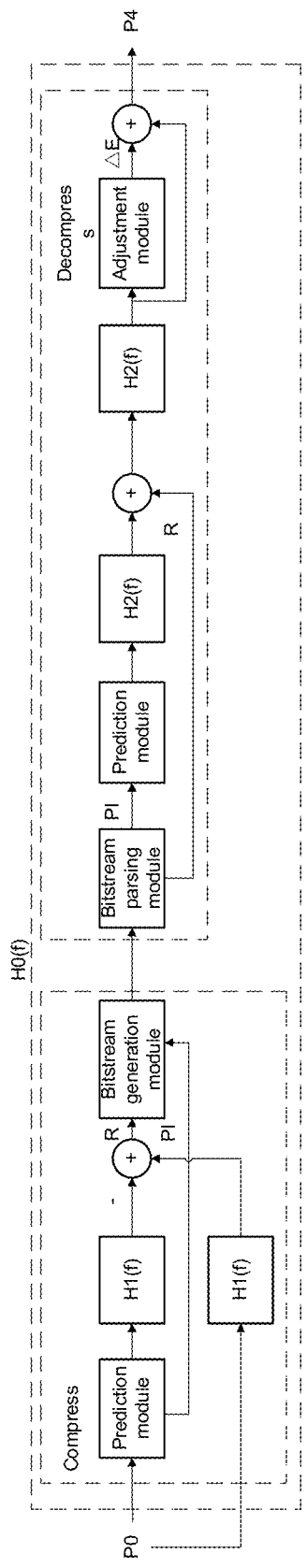
FIG. 3B is a flowchart of data compression and data decompression according to some exemplary embodiments of this disclosure.
Figure 3A:
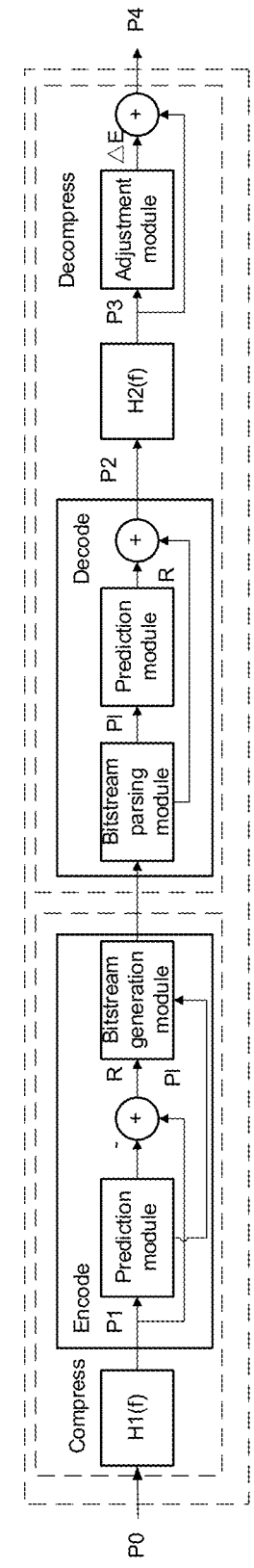
FIG. 3A is a flowchart of data compression and data decompression according to some exemplary embodiments of this disclosure.

FIG. 3A is a flowchart of data compression and data decompression according to some exemplary embodiments of this disclosure. As shown in FIG. 3A, that the data compression device 200 performs data compression on the original data may be as follows: the data compression device 200 first performs the encoding spectrum modulation on the original data, and then performs the encoding, that is, performs prediction on the data after the encoding spectrum modulation and calculates a residual thereof, so as to obtain predictive data PI and residual data R, and inputs the predictive data PI and the residual data R into a bitstream generation module for combining to obtain the compressed frame. The data compression method shown in FIG. 3A can improve encoding efficiency, further reduce an amount of data in the compressed frame, and improve the compression ratio. That the data decompression device 300 performs data decompression on the compressed frame may be as follows: the data decompression device 300 first decodes the compressed frame, that is, parses the compressed frame based on a bitstream parsing module to generate the predictive data PI and the residual data R; then obtains a predictive frame by performing a prediction based on the predictive data PI, and superimposes the residual data R on the predictive frame; and then performs the decoding spectrum modulation and boundary adjustment on superimposed data to obtain the decompressed frame $P_4$. A specific process will be described in detail in the subsequent description.

Alternatively, that the data compression device 200 performs data compression on the original data may be as follows: the encoding spectrum modulation is integrated into the encoding process. The encoding spectrum modulation may be performed at any stage in the encoding process. Correspondingly, the decoding spectrum modulation may also be performed at a corresponding stage in the decoding process.

FIG. 3B is a flowchart of data compression and data decompression according to some exemplary embodiments of this disclosure. As shown in FIG. 3B, that the data compression device 200 performs data compression on the original data may be as follows: the data compression device 200 performs a prediction on the original data to obtain a predictive frame and predictive data PI, performs the encoding spectrum modulation on the predictive frame and the original data separately and then calculates a residual to obtain residual data R, and inputs the predictive data PI and the residual data R into a bitstream generation module for combining to generate the compressed frame. Specific operations of the data compression shown in FIG. 3B are the same as those of the method shown in FIG. 3A, except that their orders of operations are different. That the data decompression device 300 performs data decompression on the compressed frame may be as follows: the data decompression device 300 parses the compressed frame based on a bitstream parsing module to generate the predictive data PI and the residual data R; obtains a predictive frame by performing a prediction based on the predictive data PI; performs the decoding spectrum modulation on the predictive frame, and then superimposes the residual data R on the predictive frame; and performs the decoding spectrum modulation and boundary adjustment on superimposed data to obtain the decompressed frame $P_4$. The method shown in FIG. 3B can reduce an amount of data in the compressed frame, and therefore improve the compression ratio and encoding efficiency of the original data, and improve transmission efficiency of the original data, while improving definition of the decompressed frame.

Figure 3D:
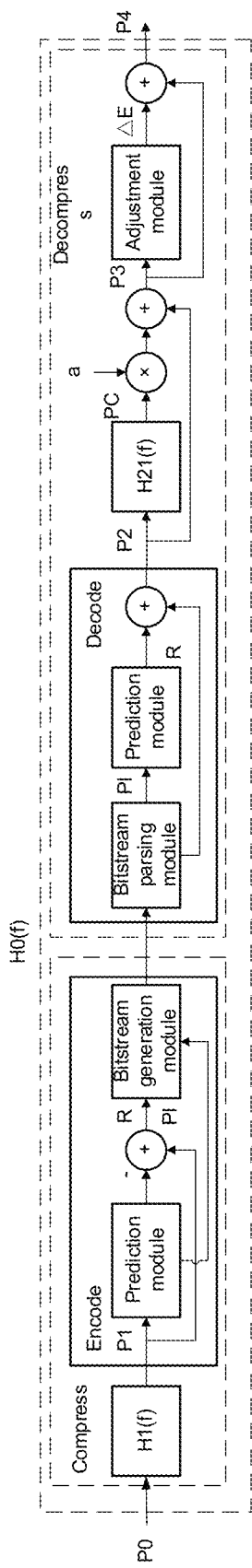
FIG. 3D is a flowchart of data compression and data decompression according to some exemplary embodiments of this disclosure.
Figure 3C:
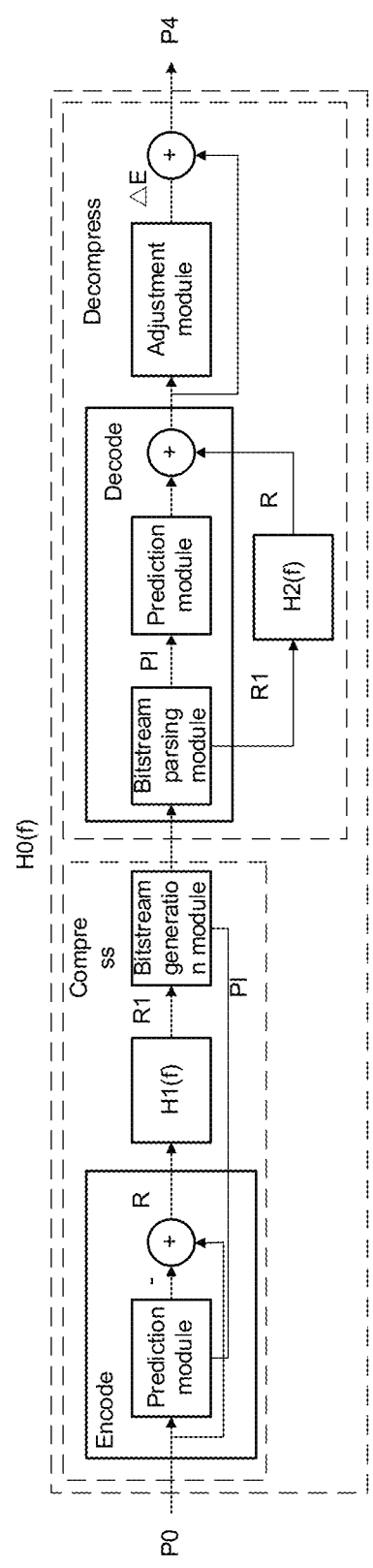
FIG. 3C is a flowchart of data compression and data decompression according to some exemplary embodiments of this disclosure.

FIG. 3C is a flowchart of data compression and data decompression according to some exemplary embodiments of this disclosure. As shown in FIG. 3C, that the data compression device 200 performs data compression on the original data may be as follows: the data compression device 200 encodes the original data, that is, performs a prediction and calculates a residual to obtain predictive data PI and residual data R, and then performs the encoding spectrum modulation on the residual data R; and inputs residual data R1 that has undergone the encoding spectrum modulation and the predictive data PI into a bitstream generation module for combining to generate the compressed frame. Specific operations of the method shown in FIG. 3C are the same as those of the method shown in FIG. 3A, except that their orders of operations are different. That the data decompression device 300 performs data decompression on the compressed frame may be as follows: the data decompression device 300 parses the compressed frame based on a bitstream parsing module to generate the predictive data PI and the residual data R1; performs the decoding spectrum modulation on the residual data R1 to obtain the residual data R; and then obtains a predictive frame by performing a prediction based on the predictive data PI, and superimposes the residual data R on the predictive frame to obtain the decompressed frame. The method shown in FIG. 3C may reduce an amount of data in the compressed frame, and therefore improve the compression ratio and encoding efficiency of the original data, and improve transmission efficiency of the original data, while improving definition of the decompressed frame.

FIG. 3D is a flowchart of data compression and data decompression according to some exemplary embodiments of this disclosure. As shown in FIG. 3D, that the data compression device 200 performs data compression on the original data may be as follows: the data compression device 200 first performs the encoding spectrum modulation on the original data, and then performs the encoding, that is, performs a prediction and calculates a residual to obtain predictive data PI and residual data R, and inputs the predictive data PI and the residual data R into a bitstream generation module for combining to obtain the compressed frame. Specific operations of the method shown in FIG. 3D are the same as those of the method shown in FIG. 3A. Details will not be described again herein. That the data decompression device 300 performs data decompression on the compressed frame may be as follows: the data decompression device 300 first decodes the compressed frame, that is, parses the compressed frame based on a bitstream parsing module to generate the predictive data PI and the residual data R; then obtains a predictive frame by performing a prediction based on the predictive data PI, and superimposes the residual data R on the predictive frame; then performs the decoding spectrum modulation on superimposed data to obtain compensation information of the superimposed data; and superimposes the compensation information on the superimposed data, and performs the boundary adjustment to obtain the decompressed frame. For ease of description and distinguishing from the decoding process shown in FIG. 3A, a decoding spectrum modulation function selected for the compensation information of the superimposed data obtained in FIG. 3D is defined as $H_{21}(f)$. The method shown in FIG. 3D may reduce an amount of data in the compressed frame, and therefore improve the compression ratio and encoding efficiency of the original data, and improve transmission efficiency of the original data, while improving definition of the decompressed frame.

Figure 4:
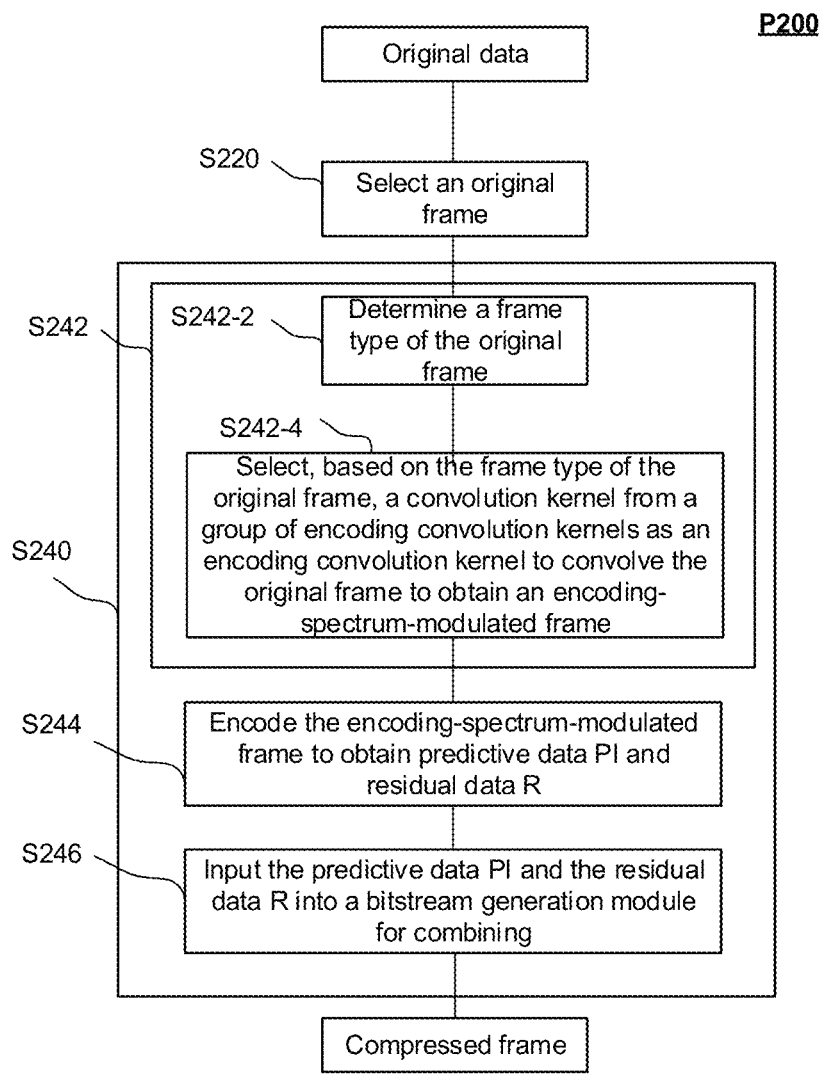
FIG. 4 is a flowchart of a data processing method for data compression according to some exemplary embodiments of this disclosure.

FIG. 4 is a flowchart of the data processing method P200 for data compression. As described above, the data compression device 200 may perform the data processing method P200. Specifically, the storage medium of the data compression device 200 may store at least one instruction set. The at least one instruction set may be configured to instruct the compression processor 220 in the data compression device 200 to implement the data processing method P200. When the data compression device 200 is in operation, the compression processor 220 may read the instruction set and perform the data processing method P200. The method P200 may include the following steps.

S220. Select an original frame from original data.

A frame is a processing unit that makes up a data sequence. In data processing, calculation is often performed in the unit of frame. The original data may include one or more original frames. The original frame may include original data of a preset quantity of bytes. As described above, this disclosure is described by using video data as an example. Therefore, the original data may be original video data, and the original frame may be a frame image in the original video data. In step S220, the data compression device 200 may select some frame images in the original data as the original frames, or may select all frame images in the original data as the original frames. The data compression device 200 may select the original frame based on an application scenario of the original data. If the original data is applied in a scenario that does not require high precision and compression quality, some frame images may be selected as the original frames. For example, for surveillance images of a quiet place, in most cases, there are no foreign objects in the pictures; therefore, most frame images of the surveillance images of this place may be the same, and the data compression device 200 may select some frame images as the original frames for compression and transmission. In another example, to ensure a desirable viewing effect of a high-definition television video, the data compression device 200 may select all frame images as the original frames for compression and transmission.

S240. Perform a data compression operation on the original frame to obtain a compressed frame.

The data compression operation may include performing encoding spectrum modulation by inputting an under-compression-frame into an encoding spectrum modulator. The under-compression-frame may include the original frame and any data state of the original frame in a prediction and residual calculation process. The encoding spectrum modulation refers to modulating an amplitude of a spectrum of the under-compression-frame. For example, the encoding spectrum modulation may be implemented by an attenuator. The attenuator may attenuate the amplitude of an under-compression-frame in a frequency domain, thereby reducing an amount of data information in this under-compression-frame. For example, the attenuator may be configured to decrease the amplitude of an under-compression-frame in a selected region in a frequency domain, for example, an amplitude in a low-frequency to intermediate-frequency region, or in another example, an amplitude in an intermediate-frequency to high-frequency region. For different forms of data, a receiver's sensitivity to frequencies is different. Therefore, in the data compression operation, different regions in a frequency domain may be selected for amplitude attenuation based on different forms of the data. As described above, taking the video data as an example, because there are rich intermediate-frequency information and high-frequency information at an edge of an object in an image, and an intermediate-frequency region and a high-frequency region may carry more data, reducing an amplitude in a region of from intermediate-frequency to high-frequency may visually blur boundary data of an under-compression-frame, and may also greatly reduce an amount of information in the image. It should be noted that decreasing an amplitude in a low-frequency region may also reduce the amount of information in the image. A person of ordinary skill in the art may understand that, as compared with a case without spectrum modulation processing, frequency components in a low-frequency to high-frequency region in an intermediate state frame that has undergone the spectrum modulation processing are reduced, and an amount of data information is also reduced. Therefore, the intermediate state frame that has undergone the spectrum modulation processing may have a higher compression ratio in encoding. For different types of data, the high-frequency region may be defined differently. In some exemplary embodiments, high frequencies may include frequencies within a range of (0.33, 0.5] in a normalized frequency domain. For example, the high frequencies may include the frequencies within any interval of (0.35, 0.5], (0.4, 0.5], and (0.45, 0.5] in the normalized frequency domain, where 0.5 is the maximum frequency.

Taking video data compression as an example, the data processing method P200 may use a combination of the encoding spectrum modulation and encoding to compress the original frame, and smoothly decrease an amplitude in a low-frequency to high-frequency region, so as to reduce the amount of data information, and further improve a compression ratio of the video data and efficiency of video transmission. The under-compression-frame herein may include any data state of the original frame during the encoding spectrum modulation and the encoding, for example, the original frame, a predictive frame, or a residual frame.

As described above, during the data compression of the original frame, the encoding spectrum modulation and the encoding may be interchanged in order, or may be performed alternately. Step S240 may include at least one of the data compression methods shown in FIG. 3A, FIG. 3B, FIG. 3C, or FIG. 3D.

For ease of presentation, step S240 will be described in detail by taking the method shown in FIG. 3A and FIG. 3D as an example, that is, a compression method in which the data compression device 200 first performs the encoding spectrum modulation on the original frame, and then encodes the original frame (that is, performs a prediction and calculates a residual) that has undergone the encoding spectrum modulation. In other words, the data compression device 200 may first perform the encoding spectrum modulation on the original frame to smoothly decrease an amplitude of the original frame in a frequency domain, thereby blurring boundary information of the original frame, obtaining an encoding-spectrum-modulated frame, reducing an amount of information in the original frame, and reducing space resources occupied by the original frame after the compression, where the under-compression-frame includes the encoding-spectrum-modulated frame; then encode the encoding-spectrum-modulated frame, that is, perform a prediction and calculate a residual to obtain a predictive frame of the encoding-spectrum-modulated frame and predictive data PI by performing a prediction on the encoding-spectrum-modulated frame; and then perform subtraction between the predictive frame of the encoding-spectrum-modulated frame and the original frame of the encoding-spectrum-modulated frame to obtain residual data R of the encoding-spectrum-modulated frame, and input the residual data R and the predictive data PI into a bitstream generation module for combining, so as to obtain the compressed frame. The data processing method P200 may improve encoding efficiency of the encoding-spectrum-modulated frame, further reduce an amount of data in the compressed frame, improve encoding efficiency, and improve a compression ratio. Because an object of the encoding spectrum modulation is the original frame, the under-compression-frame is the original frame. Taking the video data as an example, in step S240, performing the data compression on the under-compression-frame (original frame) may include the following steps performed by the at least one compression processor 220 of the data compression device 200.

S242. Perform the encoding spectrum modulation on the under-compression-frame (original frame) to obtain the encoding-spectrum-modulated frame. The encoding spectrum modulation may include using an encoding convolution kernel to convolve the under-compression-frame, so as to smoothly decrease an amplitude of the under-compression-frame in a frequency domain (low-frequency to high-frequency region). In step S242, performing the encoding spectrum modulation on the under-compression-frame may include the following steps performed by the at least one compression processor 220 of the data compression device 200.

S242-2. Determine a frame type of the original frame.

The video data is used as an example for description. A frame is a common processing unit that makes up a video data sequence. In video data processing, calculation is often performed in the unit of frame. When Recommendation ITU-T H.264/H.265 is used to encode the video data, frames are often compressed into different frame types based on frame images. Therefore, prior to performing the encoding spectrum modulation on the under-compression-frame (original frame), the data compression device 200 may need to first determine the frame type of the original frame, and an encoding convolution kernel selected for different frame types may also be different.

For a video frame sequence, specific frame types may include an intra predictive frame (I-frame), a forward predictive frame (P-frame), and a bidirectional predictive frame (B-frame). For a frame sequence with only one frame, the frame sequence is usually processed as an intra predictive frame (I-frame). The I-frame is an encoded frame compressed within a full frame. During decoding, only data of the I-frame is needed to reconstruct complete data without referring to other pictures; and the I-frame can be used as a reference frame for several subsequent frames. The P-frame is an encoded frame in which transmitted data is compressed by sufficiently reducing temporal redundancy information of a previously encoded frame in the image sequence. The P-frame is a predictive frame obtained based on a previous P-frame or I-frame. The P-frame is compressed based on a difference between the P-frame and one or more adjacent previous frames. A method of jointly compressing the P-frame and the I-frame may achieve higher compression without a significant compression trace. The P-frame only refers to an adjacent previous I-frame or P-frame. The B-frame is compressed based on differences between several adjacent previous frames, the B-frame, and several subsequent frames, that is, only the differences between the B-frame and the previous and subsequent frames are recorded. In general, the I-frame has the lowest compression efficiency, the P-frame has higher compression efficiency, and the B-frame has the highest compression efficiency. During video data encoding, some video frames may be compressed into I-frames, some may be compressed into P-frames, and others may be compressed into B-frames.

The frame type of the original frame may include at least one of the I-frame, P-frame, or B-frame.

S242-4. Select, based on the frame type of the original frame, a convolution kernel from a group of encoding convolution kernels as the encoding convolution kernel to convolve the under-compression-frame to obtain the encoding-spectrum-modulated frame.

Performing spectrum modulation on the under-compression-frame may be expressed as multiplying the under-compression-frame by a transfer function $H_1(f)$ (that is, an encoding spectrum modulation function) in a frequency domain, or performing corresponding convolution calculation in a time domain. If the under-compression-frame is digitized data, the convolution calculation may be convolution calculation performed by selecting an encoding convolution kernel corresponding to the encoding spectrum modulation function $H_1(f)$. For ease of description, the convolution in the time domain is used as an example in this disclosure to describe the spectrum modulation. However, a person skilled in the art should understand that a method of performing spectrum modulation by performing multiplication by the encoding spectrum modulation function $H_1(f)$ in a frequency domain also falls within the scope of this disclosure.

As described above, performing the encoding spectrum modulation on the under-compression-frame may be carried out by convolving the under-compression-frame in the time domain. The storage medium of the data compression device 200 may store a plurality of encoding spectrum modulators, that is, a group of encoding spectrum modulators. Each encoding spectrum modulator may include a group of encoding convolution kernels. In other words, the storage medium of the data compression device 200 may include a group of encoding convolution kernels, and the group of encoding convolution kernels may include at least one convolution kernel. When convolving the under-compression-frame, the data compression device 200 may select a convolution kernel from the group of encoding convolution kernels as the encoding convolution kernel based on a frame type of the under-compression-frame corresponding to the original frame, and then convolve the under-compression-frame. When the under-compression-frame corresponding to the original frame is an I-frame or a P-frame, convolving the I-frame or P-frame by the data compression device 200 may include: selecting a convolution kernel from the group of encoding convolution kernels as the encoding convolution kernel, and then convolving the I-frame or P-frame. Any one of the convolution kernels in the group of convolution kernels may decrease the amplitude of the I-frame or P-frame in a frequency domain, so that the amplitude in the low-frequency to intermediate-frequency region is smoothly decreased. The data compression device 200 may also select a convolution kernel with a best compression effect from the group of encoding convolution kernels as the encoding convolution kernel based on an encoding quality requirement of the original frame. When the under-compression-frame (in this exemplary embodiment, the original frame) corresponding to the original frame is a B-frame, the encoding convolution kernel for the under-compression-frame may be the same as an encoding convolution kernel corresponding to a reference frame closest to the under-compression-frame, or the encoding convolution kernel for the under-compression-frame may be the same as an encoding convolution kernel corresponding to a reference frame with highest attenuation in adjacent reference frames closest in two directions, or the encoding convolution kernel for the under-compression-frame may be an average value of encoding convolution kernels corresponding to adjacent reference frames closest in two directions. In this way, an effect of decreasing the amplitude of the under-compression-frame (original frame) is better, and an effect of the encoding spectrum modulation is better, so that the compression ratio of the video data is higher.

FIG. 5A is a graph of an encoding spectrum modulation function $H_1(f)$ according to some exemplary embodiments of this disclosure. As shown in FIG. 5A, a horizontal axis is a normalized frequency f, and a vertical axis is an amplitude modulation gain $H_1$ of the encoding spectrum modulation function $H_1(f)$. A curve 1 and a curve 2 in FIG. 5A represent different encoding spectrum modulation functions $H_1(f)$ corresponding to different encoding convolution kernels. The normalized frequency f on the horizontal axis may be divided into a low-frequency region, a medium-low-frequency region, an intermediate-frequency region, a medium-high-frequency region, and a high-frequency region. As shown in FIG. 5A, a maximum value of the normalized frequency on the horizontal axis is 0.5. As described above, the high-frequency region may include frequencies within (d, 0.5] in the normalized frequency domain, where d is a lower frequency limit of the high-frequency region. For example, d may be any frequency of 0.35, 0.36, 0.37, 0.38, 0.39, 0.4, 0.41, 0.42, 0.43, 0.44, and 0.45 in the normalized frequency domain. The intermediate-frequency region may include frequencies within (b, c], where b is a lower frequency limit of the intermediate-frequency region, and c is an upper frequency limit of the intermediate-frequency region. For example, the lower frequency limit b of the intermediate-frequency region may be any frequency of 0.15, 0.16, 0.17, 0.18, 0.19, 0.2, 0.21, 0.22, 0.23, 0.24, 0.25, 0.26, 0.27, and 0.28 in the normalized frequency domain; and the upper frequency limit c of the intermediate-frequency region may be any frequency of 0.35, 0.34, 0.33, 0.32, and 0.31 in the normalized frequency domain. The low-frequency region may include frequencies within [0, a] in the normalized frequency domain, where a is an upper frequency limit of the low-frequency region. The upper frequency limit a of the low-frequency region may be any frequency of 0.01, 0.02, 0.03, 0.04, 0.05, 0.06, 0.07, 0.08, 0.09, 0.10, 0.12, 0.13, 0.14, and 0.15 in the normalized frequency domain. When the low-frequency region is not connected to the intermediate-frequency region, a frequency region between these two is referred to as the medium-low-frequency region. When the intermediate-frequency region is not connected to the high-frequency region, a frequency region between these two is referred to as the medium-high-frequency region.

Taking the video data as an example, because human eyes are more sensitive to data in the low-frequency to intermediate-frequency region than data in the high-frequency region, when the encoding spectrum modulation is performed on the original frame of the video data, information in the low-frequency to intermediate-frequency region included in the original frame should be retained as much as possible without any loss, and amplitude gains in the intermediate-frequency region and low-frequency region should be relatively stable. Accordingly, the information in the low-frequency to intermediate-frequency region is retained as stable and complete as possible, so that the information in the low-frequency to intermediate-frequency region can be better restored during decompression. Therefore, an amplitude modulation gain $H_1$ of the encoding spectrum modulation function $H_1(f)$ used for the encoding spectrum modulation of the under-compression-frame (original frame) at any frequency f in the low-frequency to intermediate-frequency region in the frequency domain may be greater than zero, amplitudes at all frequencies processed by the encoding spectrum modulation function $H_1(f)$ in the low-frequency to intermediate-frequency region may also be greater than zero, and no data of any frequency in the low-frequency to intermediate-frequency region is lost. Therefore, when the compressed data is decompressed, data within all frequency ranges in the low-frequency to intermediate-frequency region may be restored. Otherwise, if the encoding spectrum modulation function $H_1(f)$ has a zero point in the low-frequency to intermediate-frequency region, data of a frequency part corresponding to the zero point may be lost, and a decoder cannot restore the lost data during decompression. As a result, the original data cannot be restored. As described above, the original frame is defined as $P_0$, and the encoding-spectrum-modulated frame obtained after the original frame is processed by the encoding spectrum modulation function $H_1(f)$ is defined as $P_1$. A relationship between $P_0$ and $P_1$ may be expressed by using a formula (1):

$$P_1 = H_1(f) \cdot P_0 \qquad \text{formula (1)}$$

Attenuation of the encoding spectrum modulation function $H_1(f)$ in the low-frequency to intermediate-frequency region should not be excessively high, so that an amplitude modulation gain $H_2$ of a decoding spectrum modulation function $H_2(f)$ used during the decompression of the video data is not excessively high. A relationship between $H_2(f)$ and $H_1(f)$ will be described in detail in the subsequent description. Because human eyes are relatively insensitive to high-frequency data, when the encoding spectrum modulation is performed on the original frame of the video data, an amplitude of a high-frequency part may be attenuated to a greater extent, and the amplitude in the high-frequency region is greatly decreased. In this way, data information contained in the original frame can be reduced, and the compression ratio and encoding efficiency can be improved.

Therefore, the encoding spectrum modulation function $H_1(f)$ used for the encoding spectrum modulation may smoothly decrease the amplitude of the under-compression-frame in a frequency domain. In some exemplary embodiments, the encoding spectrum modulation function $H_1(f)$ used for the encoding spectrum modulation may smoothly decrease the amplitude of the under-compression-frame in the high-frequency region in a frequency domain. The smooth decrease of the amplitude may be that the amplitude is attenuated by a first amplitude modulation gain value, or that the amplitude is attenuated within an error range around the first amplitude modulation gain value. For example, the first amplitude modulation gain may be any value between 0 and 1. For example, the first amplitude modulation gain may be within an interval specified by any two values of 0, 0.04, 0.08, 0.12, 0.16, 0.20, 0.24, 0.28, 0.32, 0.36, 0.40, 0.44, 0.48, 0.52, 0.56, 0.60, 0.64, 0.68, 0.72, 0.76, 0.80, 0.84, 0.88, 0.92, 0.96, and 1. The error range may be within an interval specified by any two values of 0, ±1%, ±2%, ±3%, ±4%, ±5%, ±6%, ±7%, ±8%, ±9%, ±10%, ±11%, ±12%, ±13%, ±14%, ±15%, ±16%, ±17%, ±18%, ±19%, ±20%, ±21%, ±22%, ±23%, ±24%, ±25%, ±26%, ±27%, ±28%, ±29%, ±30%, and the like. As shown in FIG. 5A, the first amplitude modulation gain resulting from the encoding spectrum modulation in the high-frequency region (probably within an interval of 0.4 to 0.5) is approximately 0.2.

In some exemplary embodiments, the encoding spectrum modulation function $H_1(f)$ used for the encoding spectrum modulation may smoothly decrease the amplitude of the under-compression-frame in the intermediate-frequency region in a frequency domain. An amplitude modulation gain resulting from the encoding spectrum modulation of the under-compression-frame in the intermediate-frequency region is a second amplitude modulation gain. In some exemplary embodiments, a value of the second amplitude modulation gain may be greater than that of the first amplitude modulation gain, as shown in FIG. 5A. When the encoding spectrum modulation is frequency attenuation (that is, when the encoding spectrum modulator is a frequency attenuator), both the first amplitude modulation gain and the second amplitude modulation gain are less than 1. In other words, the decrease of the amplitude resulting from the encoding spectrum modulation of the under-compression-frame in the intermediate-frequency region may be less than that in the high-frequency region.

Further, when the high-frequency region is not connected to the intermediate-frequency region, the encoding spectrum modulation function $H_1(f)$ may further modulate an amplitude of the under-compression-frame in the medium-high-frequency region in the frequency domain, so that a change of amplitude modulation gain in the medium-high-frequency region may be smooth and continuous.

In addition, the encoding spectrum modulation function $H_1(f)$ may also smoothly decrease the amplitude of the under-compression-frame in the low-frequency region in the frequency domain. An amplitude modulation gain resulting from the encoding spectrum modulation of the under-compression-frame in the low-frequency region is a third amplitude modulation gain. When the encoding spectrum modulation is frequency attenuation (that is, when the encoding spectrum modulator is the frequency attenuator), both the third amplitude modulation gain and the second amplitude modulation gain are less than 1. A value of the third amplitude modulation gain may be greater than or equal to that of the second amplitude modulation gain. In other words, the decrease of the amplitude resulting from the encoding spectrum modulation of the under-compression-frame in the low-frequency region may be less than or equal to that in the intermediate-frequency region.

Further, when the intermediate-frequency region is not connected to the low-frequency region, the encoding spectrum modulation function $H_1(f)$ may further modulate an amplitude of the under-compression-frame in the medium-low-frequency region in the frequency domain, so that a change of amplitude modulation gain in the medium-low-frequency region is continuous.

The encoding spectrum modulation function $H_1(f)$ may further retain a direct current part, that is, an amplitude modulation gain of a part with a frequency 0 is 1, so as to ensure that basic information in the original frame can be retained. Average value information may be obtained during data decompression to restore the original data. Therefore, the decrease of the amplitude resulting from the encoding spectrum modulation function $H_1(f)$ used for the encoding spectrum modulation in the low-frequency region may be less than that in the intermediate-frequency region. However, when the amplitude gain of the direct current part (that is, the part with the frequency 0) is not 1, the original data may also be restored by designing appropriate $H_2(f)$.

In the graph of the encoding spectrum modulation function $H_1(f)$ shown in FIG. 5A, frequencies within (0, 0.1] are low frequencies; frequencies within (0.1, 0.15] are medium-low frequencies; frequencies within (0.15, 0.33] are intermediate frequencies; frequencies within (0.33, 0.4] are medium-high frequencies; and frequencies within (0.4, 0.5] are high frequencies. The third amplitude modulation gain in the low-frequency region is greater than the second amplitude modulation gain in the intermediate-frequency region. The second amplitude modulation gain in the intermediate-frequency region is greater than the first amplitude modulation gain in the high-frequency region. In addition, the second amplitude modulation gain in the intermediate-frequency region is relatively stable, the curve 1 is about 0.5, and the curve 2 is about 0.6. The first amplitude modulation gain $H_1$ in the high-frequency region is also relatively stable, the curve 1 is slightly lower than 0.2, and the curve 2 is slightly higher than 0.2. The curve of the encoding spectrum modulation function $H_1(f)$ may be a smooth curve, or may not be a smooth curve. In engineering implementation, on a basis of achieving an amplitude decrease, the curve of the encoding spectrum modulation function $H_1(f)$ may be allowed to fluctuate within a small range, and the fluctuation has no impact on a compression effect. For other forms of data than video data, parameters of the encoding spectrum modulation function $H_1(f)$ may be set according to a receiver's sensitivity to the data. For different forms of data, the receiver's sensitivity to frequencies may also be different.

FIG. 5B is a graph of an encoding spectrum modulation function $H_1(f)$ according to some exemplary embodiments of this disclosure. A curve 3 and a curve 4 in FIG. 5B represent different encoding spectrum modulation functions $H_1(f)$ corresponding to different encoding convolution kernels. With regard to the video data, in some special application scenarios such as reconnaissance scenarios, it is necessary to properly retain more high-frequency components. Therefore, in some exemplary embodiments, in the curve of the encoding spectrum modulation function $H_1(f)$, the first amplitude modulation gain may be greater than the second amplitude modulation gain (curve 3), or equal to the second amplitude modulation gain (curve 4).

With regard to the video data, in some application scenarios that do not require high image quality, high-frequency components may be completely filtered out. Therefore, an amplitude modulation gain $H_1$ of the encoding spectrum modulation function $H_1(f)$ used for the encoding spectrum modulation of the under-compression-frame (original frame) at any frequency in the low-frequency to intermediate-frequency region in a frequency domain may be greater than zero, but the amplitude modulation gain $H_1$ in the high-frequency region may be equal to 0 (not shown in FIG. 5A and FIG. 5B).

It should be noted that the curves shown in FIG. 5A and FIG. 5B are described using the video data as an example. A person skilled in the art should understand that the curve of the encoding spectrum modulation function $H_1(f)$ is not limited to the forms shown in FIG. 5A and FIG. 5B. All encoding spectrum modulation functions $H_1(f)$ that can smoothly decrease an amplitude of the original frame in the intermediate-frequency region in a frequency domain, as well as a linear combination of encoding spectrum modulation functions $H_1(f)=\sum_{i=1}^n k_i H_{1,i}(f)$, a product combination of encoding spectrum modulation functions $H_1(f)=\prod_{j=1}^n k_j H_{1,j}(f)$, and a combination of a linear combination and a product combination all fall within the scope of this disclosure, where $i \geq 1$, $H_1(f)=\sum_{i=1}^n k_i H_{1,i}(f)$ represents a linear combination of n functions, $H_{1,i}(f)$ represents an ith function, $k_i$ represents a weight corresponding to the ith function, $j \geq 1$, $H_1(f)=\prod_{j=1}^n k_j H_{1,j}(f)$ represents a product combination of the n functions, $k_j$ represents a weight corresponding to a jth function, and $H_{1,i}(f)$ may be any function.

FIG. 6 is a parameter table of an encoding convolution kernel according to some exemplary embodiments of this disclosure. FIG. 6 exemplarily lists parameters of an encoding convolution kernel, where each row in FIG. 6 represents an encoding convolution kernel. For a video image of 8 bits, it is necessary to ensure that grayscale values of pixels in the encoding-spectrum-modulated frame obtained after the encoding convolution are within a range of 0 to 255. Therefore, in some exemplary embodiments, it is necessary to divide a convolution result by 256. The encoding convolution kernel may be obtained through a Fourier transform based on the encoding spectrum modulation function $H_1(f)$. FIG. 6 is only an exemplary illustration. A person skilled in the art should know that the encoding convolution kernel is not limited to the parameters shown in FIG. 6. All encoding convolution kernels that can cause a smooth decrease of the amplitude of the original frame in the intermediate-frequency region in a frequency domain fall within the scope of this disclosure.

When the data compression device 200 uses the encoding convolution kernel to convolve the under-compression-frame, the under-compression-frame (original frame) may be convolved in at least one of a vertical direction, a horizontal direction, or an oblique direction.

It should be noted that when the under-compression-frame is convolved, a data processing unit processed in the convolution may be a frame of data, or may be a part of a frame of data. Taking the video data as an example, the unit may be a frame or a field of image, or a part of a frame or a field of image. For example, in video encoding, an image may be further segmented into slices, tiles, coding units (CUs), macroblocks, or blocks. Convolution objects include, but are not limited to, image segmentation units described by the foregoing terms. For different processing units, a same encoding convolution kernel may be selected, or different encoding convolution kernels may be selected.

S244. Encode the encoding-spectrum-modulated frame (perform a prediction and calculate a residual) to obtain the predictive data PI and the residual data R.

S246. Input the predictive data PI and the residual data R into the bitstream generation module for combining to obtain the compressed frame.

After the data compression device 200 performs the encoding spectrum modulation on the original frame, the encoding-spectrum-modulated frame is obtained. Low-frequency to high-frequency components in the encoding-spectrum-modulated frame are smaller than low-frequency to high-frequency components in the original frame. Therefore, the data compression device 200 may improve encoding efficiency of the encoding-spectrum-modulated frame by performing encoding and bitstream generation calculation after performing the encoding spectrum modulation on the under-compression-frame (original frame), thereby improving the compression ratio of the original frame and transmission efficiency of the original data.

Figure 7:
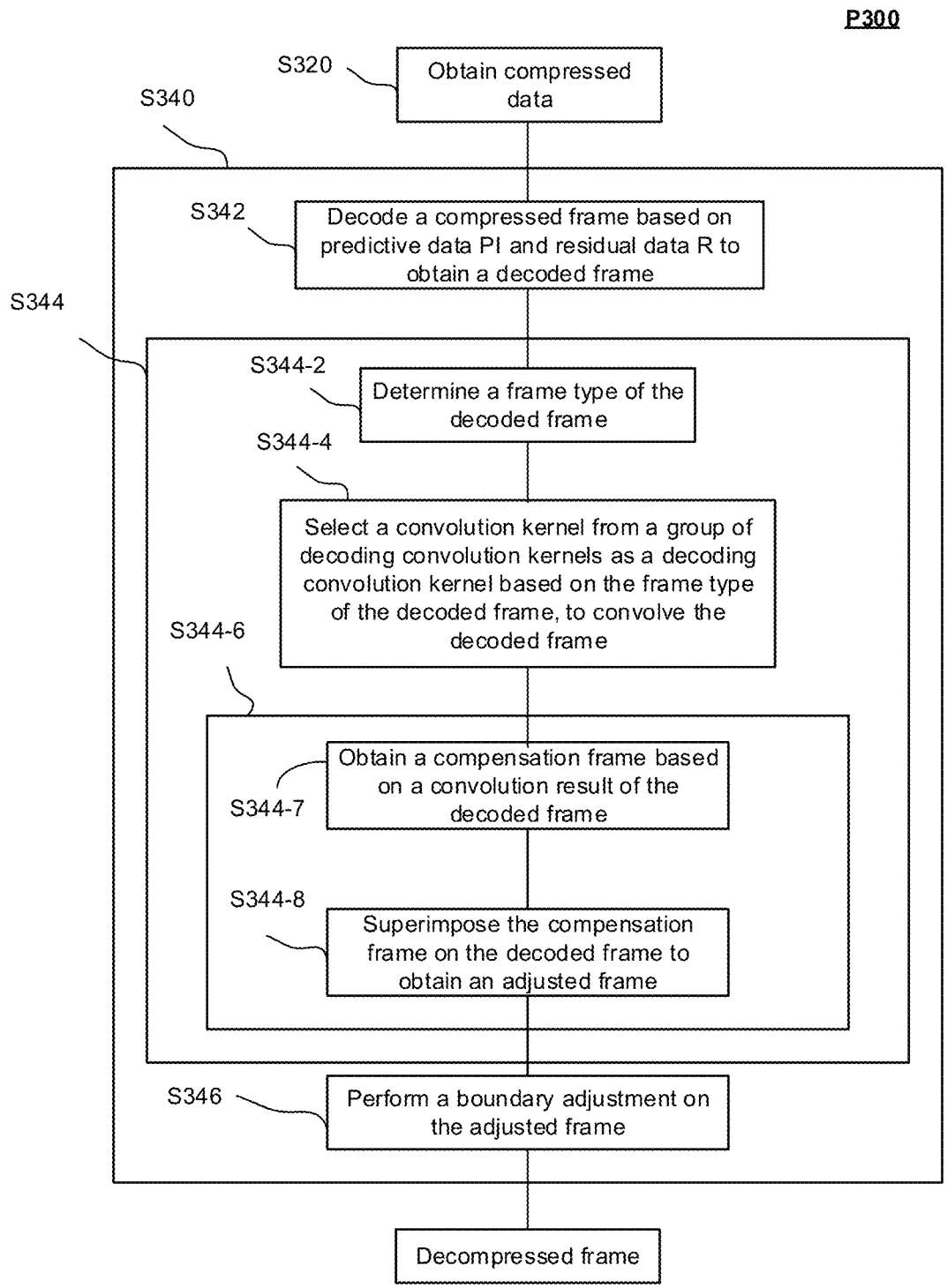
FIG. 7 is a flowchart of a data processing method for decompressing a compressed frame according to some exemplary embodiments of this disclosure.

FIG. 7 is a flowchart of the data processing method P300 for decompressing a compressed frame. As described above, the data decompression device 300 may perform the data processing method P300. Specifically, a storage medium of the data decompression device 300 may store at least one instruction set. The at least one instruction set may be configured to instruct a decompression processor in the data decompression device 300 to implement the data processing method P300. When the data decompression device 300 is in operation, the decompression processor may read the at least one instruction set and perform the data processing method P300. The method P300 may include the following steps.

S320. Obtain compressed data, where the compressed data includes the compressed frame.

The compressed data may include the compressed frame obtained by performing data compression on the original frame in the original data by using the data processing method P200. The compressed frame includes compressed predictive data PI and residual data R. As shown in FIG. 3A, FIG. 3B, FIG. 3C, and FIG. 3D, step S320 may include: inputting the compressed frame into the bitstream parsing module for analysis calculation to obtain the predictive data PI and the residual data R. As described above, in the present disclosure, a frame is a common processing unit that makes up a data sequence. In data processing, calculation is often performed in the unit of frame. In the data processing method P200 for compressing data by the data compression device 200, the original data may be compressed in the unit of frame. When decompressing the compressed frame, the data decompression device 300 may also perform data decompression in the unit of frame. The data compression includes performing the encoding spectrum modulation on the original frame.

S340. Perform data decompression on the compressed frame to obtain a decompressed frame.

The data decompression refers to performing decompression calculation on the compressed frame to obtain the decompressed frame, so that the original data is restored or basically restored in the decompressed frame, or that the decompressed frame is even clearer than the original data. The data decompression includes performing decoding spectrum modulation and a boundary adjustment on an under-decompression-frame. The under-decompression-frame herein includes any one of the compressed frame and the compressed frame in any data state during the performing of data decompression before obtaining the decompressed frame based on the predictive data PI and the residual data R.

The decoding spectrum modulation corresponds to the encoding spectrum modulation, and refers to inputting the under-decompression-frame into a decoding spectrum modulator to perform spectrum modulation. The decoding spectrum modulation may enable the under-decompression-frame that has undergone the encoding spectrum modulation to be restored or basically restored to a state before the encoding spectrum modulation without considering calculation errors, or even to exceed a state before the encoding spectrum modulation. As described above, the encoding spectrum modulation may attenuate an amplitude of an under-compression-frame in a low-frequency to high-frequency region in a frequency domain to blur boundary data of the under-compression-frame, so that an amount of data generated by encoding is reduced. The decoding spectrum modulation may restore or even improve data that has undergone the encoding spectrum modulation. The decoding spectrum modulation may restore or basically restore an amplitude of the under-decompression-frame at a sensitive frequency to a state before the attenuation or even enhance an amplitude in comparison with a state before the attenuation. Taking video data as an example, because human eyes are relatively sensitive to low-frequency to intermediate-frequency information in an image, the decoding spectrum modulation may restore or even enhance an amplitude in a low-frequency to intermediate-frequency region in the video data. Therefore, an amplitude of the decompressed frame in the low-frequency to intermediate-frequency region should be at least restored or basically restored to an amplitude of the original frame in the low-frequency to intermediate-frequency region. In the video data, because human eyes are relatively insensitive to high-frequency data, the decoding spectrum modulation may not restore an amplitude in a high-frequency region, so that the amplitude in the high-frequency region remains attenuated. Therefore, an association relationship exists between a decoding convolution kernel and decoding spectrum modulation function $H_2(f)$ used for the decoding spectrum modulation and an encoding convolution kernel and encoding spectrum modulation function $H_1(f)$ used for the encoding spectrum modulation. The association relationship will be described in detail in the subsequent description.

Similar to the encoding spectrum modulation, the decoding spectrum modulation may perform a convolution in a time domain to modulate a spectrum of the under-decompression-frame by using the decoding spectrum modulation function $H_2(f)$ (that is, a decoding transfer function) in a frequency domain. By selecting the corresponding decoding spectrum modulation function $H_2(f)$ and decoding convolution kernel, the two methods may achieve a same effect. For ease of description, the convolution in the time domain is used as an example to describe the decoding spectrum modulation in this disclosure. However, a person skilled in the art should understand that a method of performing spectrum modulation by performing multiplication by the decoding spectrum modulation function $H_2(f)$ in a frequency domain also falls within the scope of this disclosure.

Taking the video data as an example, the data processing method P200 may use a combination of encoding spectrum modulation and encoding to compress the original frame to further improve a compression ratio of the video data and efficiency of video transmission. In a video decompression technology, the data processing method P300 may use a combination of decoding (that is, restoring the under-compression-frame based on the residual data R and the predictive data PI) and decoding spectrum modulation to decompress the compressed frame, so as to restore data from the compressed frame. The under-decompression-frame herein may include any one of the compressed frame as well as the compressed frame in any data state in a process of decoding the compressed frame based on the predictive data PI and the residual data R. For example, the under-decompression-frame may be the compressed frame, or may be a decoded frame obtained through decoding or a predictive frame obtained through a prediction.

The data decompression operation may be performed in a reverse order with respect to the compression operation. As described above, the encoding spectrum modulation may be performed at any stage in the compression operation. Correspondingly, the decoding spectrum modulation may be performed at a corresponding stage in the decompression operation. For example, the data decompression operation, that is, step S340, may include at least one of the data decompression methods shown in FIG. 3A, FIG. 3B, FIG. 3C, and FIG. 3D.

For ease of presentation, the data decompression will be described in detail in this disclosure by using an example in which the data decompression device 300 first decodes the compressed frame and then performs the decoding spectrum modulation (the method shown in FIG. 3A and FIG. 3D). In step S340, performing the data decompression on the compressed frame includes the following operations by at least one decompression processor of the data decompression device 300.

S342. Decode the compressed frame based on the predictive data PI and the residual data R to obtain a decoded frame.

The compressed frame may be obtained by encoding the spectrum-modulated frame by the data compression device 200. The data decompression device 300 may decode the compressed frame to obtain the decoded frame. Certain errors may exist in the encoding and decoding processes. Therefore, data in the decoded frame is basically consistent with that in the encoding-spectrum-modulated frame. Because the decoded data is data generated in the process of decoding the compressed frame, the decoded frame belongs to the under-decompression-frame. For ease of description, the decoded frame is defined as $P_2$. As described above, assuming that a slight deviation is caused in the encoding and decoding processes, the data in the decoded frame is basically consistent with that in the encoding-spectrum-modulated frame. Therefore, a relationship between $P_1$ and $P_2$ may be expressed by using the following formula:

$$P_2 \approx P_1 \qquad \text{formula (2)}$$

S344. Perform the decoding spectrum modulation on the decoded frame to obtain an adjustment frame.

The decoding spectrum modulation includes using a corresponding decoding convolution kernel to convolve the under-decompression-frame (decoded frame) based on the decoding convolution kernel, so that the data in the decoded frame can be restored or basically restored to the data of the original frame. In step S344, performing the decoding spectrum modulation on the decoded frame may include the following steps performed by the at least one decompression processor 320 of the data decompression device 300.

S344-2. Determine a frame type of the decoded frame.

As described above, in the process of compressing the original frame, the data compression device 200 may encode the original frame or the encoding-spectrum-modulated frame into different types. Therefore, before performing the decoding spectrum modulation on the decoded frame, the data decompression device 300 needs to first determine the frame type of the decoded frame, and a decoding convolution kernel selected for different frame types may also be different. The frame type of the decoded frame may include at least one of an I-frame, a P-frame, or a B-frame. The frame type of the decoded frame may include only one frame type, or may include a plurality of frame types simultaneously. A method for determining the frame type of the decoded frame is relatively mature, and is not a focus in this disclosure, and therefore is not described herein.

S344-4. Select a convolution kernel from a group of decoding convolution kernels as the decoding convolution kernel based on the frame type of the decoded frame to convolve the decoded frame.

As described above, performing the decoding spectrum modulation on the decoded frame may be carried out by convolving the decoded frame in a time domain. The storage medium of the data decompression device 300 may store a plurality of different decoding convolution kernels, referred to as a group of decoding convolution kernels. Each encoding convolution kernel corresponds to at least one decoding convolution kernel in the group of decoding convolution kernels. When convolving the decoded frame, the data decompression device 300 may select a convolution kernel from the group of decoding convolution kernels as the decoding convolution kernel based on the frame type of the decoded frame to convolve the decoded frame. The operation of using the decoding convolution kernel to convolve the under-decompression-frame may be referred to as a decoding spectrum modulator. When the decoded frame is an I-frame or a P-frame, convolving the I-frame or P-frame by the data decompression device 300 may include: selecting any convolution kernel from the group of decoding convolution kernels as the decoding convolution kernel, and then convolving the I-frame or P-frame. The data decompression device 300 may also select a convolution kernel with a best decompression effect from the group of decoding convolution kernels as the decoding convolution kernel according to a decoding quality requirement of the decoded frame. When the decoded frame is a B-frame, the decoding convolution kernel for the decoded frame may be the same as a decoding convolution kernel for a reference frame closest to the decoded frame, or the decoding convolution kernel for the decoded frame may be the same as a decoding convolution kernel corresponding to a reference frame with highest attenuation in adjacent reference frames closest in two directions, or the decoding convolution kernel for the decoded frame may be an average value of decoding convolution kernels corresponding to adjacent reference frames closest in two directions.

When the data decompression device 300 uses the decoding convolution kernel to convolve the decoded frame, the decoded frame may be convolved in at least one of a vertical direction, a horizontal direction or an oblique direction. A convolution direction of the decoded frame is the same as that of the original frame, and a convolution order of the decoded frame is opposite to that of the original frame. If the original frame is convolved only in the vertical direction, the decoded frame is also convolved only in the vertical direction. Likewise, if the original frame is convolved only in the horizontal direction or the oblique direction, the decoded frame is also convolved only in the horizontal direction or the oblique direction. If the original frame is convolved in a plurality of directions, the decoded frame is also convolved in a plurality of directions, and convolution directions and orders of the decoded frame are opposite to convolution directions and orders of the original frame. That is, if the original frame is first convolved in the vertical direction and then convolved in the horizontal direction, the decoded frame is first convolved in the horizontal direction and then convolved in the vertical direction.

S344-6. Obtain the adjustment frame based on a convolution result of the decoded frame.

For ease of description, the adjustment frame is defined as $P_3$. Using the video data as an example, because human eyes are relatively sensitive to information in the low-frequency to intermediate-frequency region, $H_2(f)$ is selected based on $H_1(f)$, and $H_1(f)$ is designed to retain frequency information of all frequencies in the low-frequency to intermediate-frequency region in $P_0$. Therefore, theoretically, without considering a deviation caused by other algorithms, all the frequency information of the low-frequency to intermediate-frequency region in $P_0$ may be restored or basically restored in $P_3$. In other words, the data decompression may restore or even improve the data that has undergone the data compression at any frequency in the low-frequency to intermediate-frequency region. Therefore, after the data decompression, an amplitude of the adjustment frame $P_3$ at any frequency in the low-frequency to intermediate-frequency region should be approximately equal to or greater than that of the original frame $P_0$. Being approximately equal means that the amplitude of the adjustment frame $P_3$ is equal to the amplitude of the original frame $P_0$ and fluctuates within an error range. Using the video data as an example, when the amplitude of the adjustment frame $P_3$ at any frequency in the low-frequency to intermediate-frequency region is restored to 85% or above 85% of that of the original frame $P_0$, it is difficult for human eyes to perceive a difference between the adjustment frame and the original frame. Therefore, after the data decompression, the amplitude of the adjustment frame $P_3$ at any frequency in the low-frequency to intermediate-frequency region should not be less than 85% of that of the original frame $P_0$. That is, the error range should not cause the amplitude of the adjustment frame $P_3$ at any frequency in the low-frequency to intermediate-frequency region to be less than 85% of that of the original frame $P_0$. Because human eyes are relatively insensitive to information in the high-frequency region, the information in the high-frequency region may be retained in the adjustment frame $P_3$ to adapt to a scenario requiring high quality, or may be attenuated to suppress unnecessary high-frequency noise. A relationship between $P_0$ and $P_3$ may be expressed by using the following formulae:

$$\begin{cases} P_3 \geq P_0, (f \leq f_0) \\ P_3 < P_0, (f > f_0) \end{cases} \quad \text{formula (3)}$$

or $$\begin{cases} P_3 \geq P_0, (f \leq f_0) \\ P_3 \geq P_0, (f > f_0) \end{cases} \quad \text{formula (4)}$$

It should be noted that an error range may be allowed in the formula. For example, for $P_3 \geq P_0$, in a case in which a basic value of $P_3$ is greater than or equal to $P_0$, $P_3$ may be allowed to fluctuate within an error range. That is, when $P_3 = P_0$, in a case in which $P_3$ has a negative error, $P_3$ may be allowed to be slightly less than $P_0$. Herein only a basic relationship between $P_3$ and $P_0$ is illustrated in the formula, but no error is included into the formula. A person skilled in the art should know that a case in which the amplitude of the adjustment frame in the low-frequency to intermediate-frequency region is slightly less than that of the original frame due to a fluctuation within an error range also falls within the scope of this disclosure. In the following formulas, errors within an error range are also allowed. The following also provides only a description about the basic relationship that the amplitude of $P_3$ is greater than or equal to the amplitude of the original frame $P_0$. Fluctuations within the error range may be derived by a person skilled in the art.

For ease of description, a global spectrum modulation function between $P_0$ and $P_3$ is defined as $H_0(f)$. In this case, the relationship between $P_0$ and $P_3$ may be expressed by using the following formula:

$$P_3 = H_0(f) \cdot P_0 \quad \text{formula (5)}$$

In this case, the global spectrum modulation function $H_0(f)$ may be expressed by using the following formula:

$$\begin{cases} H_0(f) \geq 1, (f \leq f_0) \\ H_0(f) < 1, (f > f_0) \end{cases} \quad \text{formula (6)}$$

or $$\begin{cases} H_0(f) \geq 1, (f \leq f_0) \\ H_0(f) \geq 1, (f > f_0) \end{cases} \quad \text{formula (7)}$$

In the formula, $f_0$ is a boundary value of a frequency to which human eyes are sensitive. For the video data, $f_0$ may be 0.33 or other values larger or smaller than 0.33. For different types of data, a value of $f_0$ may be different.

For $H_0(f)$ in the foregoing formulas (6) and (7), when $H_0(f)$ in a selected frequency domain interval is approximately equal to 1, data of the adjustment frame in the selected frequency domain interval may be restored to data of the original frame; or when $H_0(f)$ in a selected frequency domain interval is greater than 1, data of the adjustment frame in the selected frequency domain interval may be enhanced, that is, an amplitude of the adjustment frame in the selected region is higher than that of the original frame. For example, if the original frame is one frame in a video, as long as $H_0(f)$ in the selected frequency domain interval is greater than 1, a definition enhancement may be implemented. For ease of description, $H_0(f) \approx 1$ is defined as a normal mode, and $H_0(f)>1$ is defined as an enhanced mode. The following describes the global spectrum modulation function $H_0(f)$ in detail by using the video data as an example.

Figure 8A:
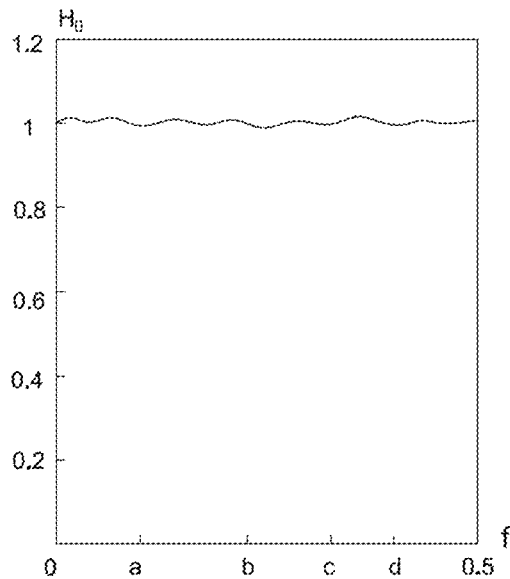
FIG. 8A is a graph of a global modulation function $H_0(f)$ according to some exemplary embodiments of this disclosure.
Figure 8B:
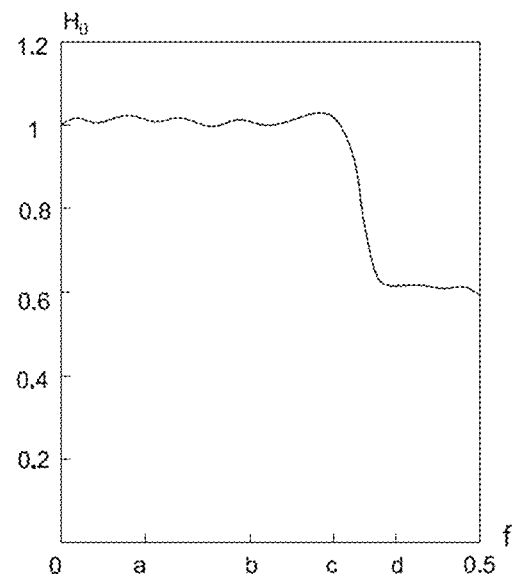
FIG. 8B is a graph of a global modulation function $H_0(f)$ according to some exemplary embodiments of this disclosure.
Figure 8C:
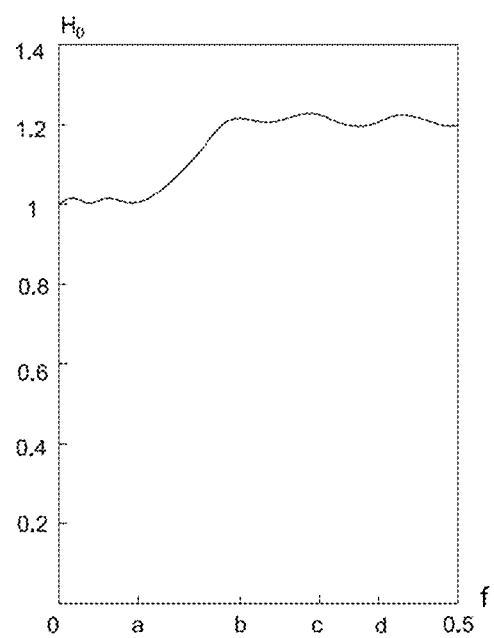
FIG. 8C is a graph of a global modulation function $H_0(f)$ according to some exemplary embodiments of this disclosure.
Figure 8D:
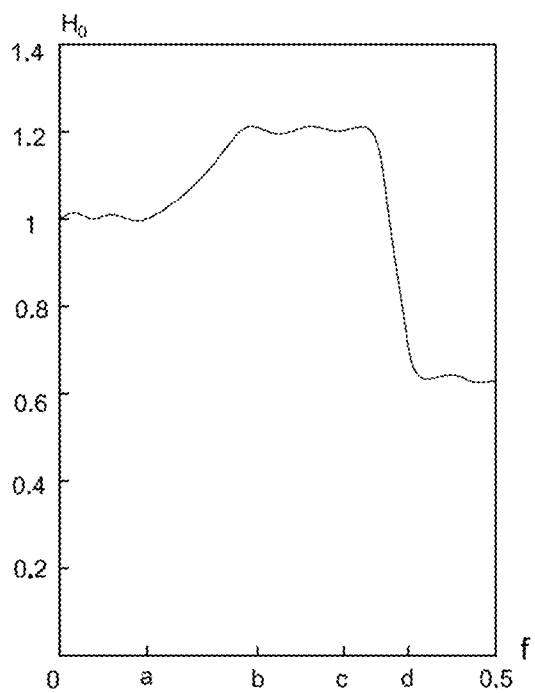
FIG. 8D is a graph of a global modulation function $H_0(f)$ according to some exemplary embodiments of this disclosure.
Figure 8E:
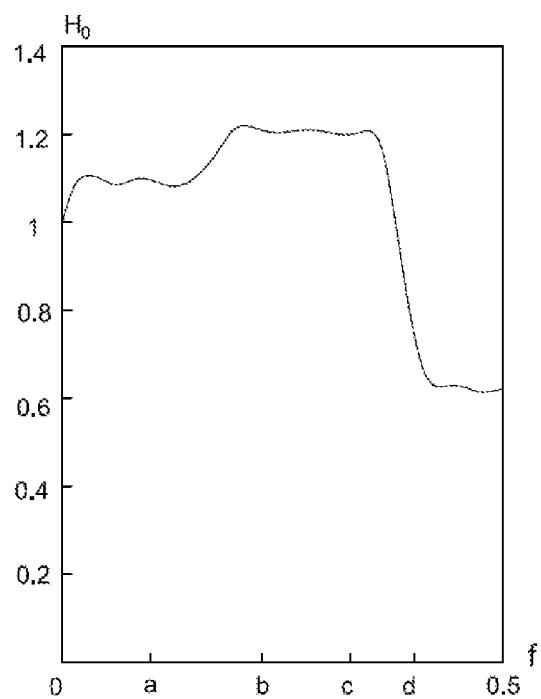
FIG. 8E is a graph of a global modulation function $H_0(f)$ according to some exemplary embodiments of this disclosure.

FIG. 8A is a graph of a global modulation function $H_0(f)$ according to some exemplary embodiments of this disclosure. FIG. 8B is a graph of a global modulation function $H_0(f)$ according to some exemplary embodiments of this disclosure. FIG. 8C is a graph of a global modulation function $H_0(f)$ according to some exemplary embodiments of this disclosure. FIG. 8D is a graph of a global modulation function $H_0(f)$ according to some exemplary embodiments of this disclosure. FIG. 8E is a graph of a global modulation function $H_0(f)$ according to some exemplary embodiments of this disclosure. As shown in FIG. 8A to FIG. 8E, a horizontal axis is a normalized frequency f, and a vertical axis is an amplitude modulation gain $H_0(f)$ of the global spectrum modulation function $H_0$. Curves in FIG. 8A to FIG. 8E represent different global spectrum modulation functions $H_0(f)$. A maximum value of the normalized frequency on the horizontal axis is 0.5. The normalized frequency f on the horizontal axis may be divided into a low-frequency region, a medium-low-frequency region, an intermediate-frequency region, a medium-high-frequency region, and a high-frequency region. Frequencies within (0, a] are low frequencies; frequencies within (a, b] are medium-low frequencies; frequencies within (b, c] are intermediate frequencies; frequencies within (c, d] are medium-high frequencies; and frequencies within (d, 0.5] are high frequencies. For values of a, b, c, d, and e, reference may be made to FIG. 5A, and details are not described again herein.

Because human eyes are more sensitive to data in the low-frequency to intermediate-frequency region than data in the high-frequency region in the video data, after the data decompression, the information in the low-frequency to intermediate-frequency region in the adjustment frame relative to the original frame should be retained as much as possible without any loss. In other words, the global spectrum modulation function $H_0(f)$ should cause the amplitude of the adjustment frame in the low-frequency to intermediate-frequency region not to be less than 85% of that of the original frame, or may even enable the former to be greater than that of the original frame. Because human eyes are insensitive to the information in the high-frequency region, the amplitude of the adjustment frame in the high-frequency region may be selected according to different application scenarios. For example, in a scenario requiring low definition, the amplitude of the adjustment frame in the high-frequency region may be less than that of the original frame. In a reconnaissance scenario, the amplitude of the adjustment frame in the high-frequency region may be approximately equal to or even greater than that of the original frame. As shown in FIG. 8A to FIG. 8E, an amplitude modulation gain $H_0$ of the global modulation function $H_0(f)$ at any frequency f in the low-frequency to intermediate-frequency region (including the low-frequency region and intermediate-frequency region) is greater than 1 or approximately equal to 1, so that the amplitude of the adjustment frame after the decompression is not less than 85% of that of the original frame, and definition is restored or enhanced, thereby enhancing a visual effect. Being approximately equal to 1 herein may be fluctuating within an error range around 1. The error range may be within an interval specified by any two values of 0, ±1%, ±2%, ±3%, ±4%, ±5%, ±6%, ±7%, ±8%, ±9%, ±10%, ±11%, ±12%, ±13%, ±14%, ±15%, and the like. For ease of description, an amplitude modulation gain of the global modulation function $H_0(f)$ in the high-frequency region is defined as a first amplitude modulation gain, an amplitude modulation gain in the intermediate-frequency region is defined as a second amplitude modulation gain, and an amplitude modulation gain in the low-frequency region is defined as a third amplitude modulation gain. The third amplitude modulation gain value, the second amplitude modulation gain value, and the first amplitude modulation gain value may fluctuate within the error range.

As shown in FIG. 8A, the third amplitude modulation gain value, the second amplitude modulation gain value, and the first amplitude modulation gain value of the global modulation function $H_0(f)$ in the low-frequency to high-frequency region are all approximately equal to 1, so that none of amplitudes of the adjustment frame in the low-frequency to high-frequency region is less than that of 85% of the original frame, and data of the adjustment frame in the low-frequency to high-frequency region can be smoothly restored or basically restored to a state of the original frame.

As shown in FIG. 8B, the third amplitude modulation gain value and the second amplitude modulation gain value of the global modulation function $H_0(f)$ in the low-frequency to intermediate-frequency region are approximately equal to 1, so that data of the adjustment frame in the low-frequency to intermediate-frequency region can be smoothly restored or basically restored to a state of the original frame. The first amplitude modulation gain value of the global modulation function $H_0(f)$ in the high-frequency region is less than 1, so that the amplitude of the adjustment frame in the high-frequency region is smoothly decreased in comparison with that of the original frame, so as to suppress high-frequency noise. The smooth decrease of the amplitude may be that the amplitude is attenuated by the first amplitude modulation gain value, or that the amplitude is attenuated within an error range around the first amplitude modulation gain value. For example, the first amplitude modulation gain may be any value between 0 and 1. For example, the first amplitude modulation gain value may be within an interval specified by any two values of 0, 0.04, 0.08, 0.12, 0.16, 0.20, 0.24, 0.28, 0.32, 0.36, 0.40, 0.44, 0.48, 0.52, 0.56, 0.60, 0.64, 0.68, 0.72, 0.76, 0.80, 0.84, 0.88, 0.92, 0.96, and 1. As shown in FIG. 8B, the first amplitude modulation gain of the global modulation function $H_0(f)$ in the high-frequency region (probably within an interval of 0.4 to 0.5) is around 0.6. Both the second and third amplitude modulation gain values are around 1. The second and third amplitude modulation gain values may fluctuate within an error range. For example, the second and third amplitude modulation gain values may be within an interval specified by any two values of 0.85, 0.90, 0.95, 1, 1.05, 1.10, and 1.15.

As shown in FIG. 8C, the third amplitude modulation gain value of the global modulation function $H_0(f)$ in the low-frequency region is approximately equal to 1, so that data of the adjustment frame in the low-frequency region can be restored or basically restored to a state of the original frame. Both the second amplitude modulation gain value of the global modulation function $H_0(f)$ in the intermediate-frequency region and the first amplitude modulation gain value in the high-frequency region are greater than 1, so that the amplitude of the adjustment frame in the intermediate-frequency to high-frequency region is smoothly increased in comparison with that of the original frame and that definition of the data in the intermediate-frequency to high-frequency region is enhanced. The smooth increase of the amplitude may be that the amplitude is enhanced by the second amplitude modulation gain value and the first amplitude modulation gain value, or may be that the amplitude is enhanced within an error range around the second amplitude modulation gain value and the first amplitude modulation gain value. The second amplitude modulation gain value and the first amplitude modulation gain value may be approximately consistent, or the second amplitude modulation gain value may be greater than the first amplitude modulation gain value, or the second amplitude modulation gain value may be less than the first amplitude modulation gain value. In the curve shown in FIG. 8C, the second amplitude modulation gain value and the first amplitude modulation gain value are approximately consistent. The second amplitude modulation gain value and the first amplitude modulation gain value may be any values greater than 1. For example, the second amplitude modulation gain value and the first amplitude modulation gain value may be within an interval specified by any two values of 1, 1.1, 1.2, 1.3, 1.4, 1.5, 1.6, 1.7, 1.8, 1.9, 2, 2.1, 2.2, and 2.4. As shown in FIG. 8C, the second amplitude modulation gain and the first amplitude modulation gain of the global modulation function $H_0(f)$ in the intermediate-frequency to high-frequency region are around 1.2.

As shown in FIG. 8D, the third amplitude modulation gain value of the global modulation function $H_0(f)$ in the low-frequency region is approximately equal to 1, so that data of the adjustment frame in the low-frequency region can be restored or basically restored to a state of the original frame. The second amplitude modulation gain value of the global modulation function $H_0(f)$ in the intermediate-frequency region is greater than 1, so that the amplitude of the adjustment frame in the intermediate-frequency region is smoothly increased in comparison with that of the original frame, and that definition of the data in the intermediate-frequency region is enhanced. The first amplitude modulation gain value of the global modulation function $H_0(f)$ in the high-frequency region is less than 1, so that the amplitude of the adjustment frame in the high-frequency region is smoothly decreased in comparison with that of the original frame and that an amount of data in the insensitive high-frequency region is reduced, so as to suppress high-frequency noise. The curve shown in FIG. 8D can enhance definition while reducing the amount of data. The second amplitude modulation gain value may be any value greater than 1. The first amplitude modulation gain may be any value between 0 and 1. As shown in FIG. 8D, the second amplitude modulation gain of the global modulation function $H_0(f)$ in the intermediate-frequency region is around 1.2, and the first amplitude modulation gain in the high-frequency region is around 0.6.

As shown in FIG. 8E, the third amplitude modulation gain value of the global modulation function $H_0(f)$ in the low-frequency region is greater than 1, so that the amplitude of the adjustment frame in the low-frequency region is smoothly increased in comparison with that of the original frame. The second amplitude modulation gain value of the global modulation function $H_0(f)$ in the intermediate-frequency region is greater than 1, so that the amplitude of the adjustment frame in the intermediate-frequency region is smoothly increased in comparison with that of the original frame, and that definition of the data in the low-frequency to intermediate-frequency region is enhanced. The second amplitude modulation gain value may be equal to the third amplitude modulation gain value, or may be greater than the third amplitude modulation gain value. In the curve shown in FIG. 8E, the second amplitude modulation gain value is greater than the third amplitude modulation gain value, so that the increase of the amplitude of the adjustment frame in the intermediate-frequency region is greater than the increase of the amplitude of the adjustment frame in the low-frequency region. Therefore, definition of the intermediate-frequency region to which human eyes are most sensitive is enhanced, and the visual effect is enhanced. The first amplitude modulation gain value of the global modulation function $H_0(f)$ in the high-frequency region is less than 1, so that the amplitude of the adjustment frame in the high-frequency region is smoothly decreased in comparison with that of the original frame and that an amount of data in the insensitive high-frequency region is reduced, so as to suppress high-frequency noise. The curve shown in FIG. 8E can enhance definition while reducing the amount of data. The third amplitude modulation gain value may be a value slightly greater than 1. For example, the third amplitude modulation gain value may be within an interval specified by any two values of 1, 1.04, 1.08, 1.12, 1.16, and 1.2. The second amplitude modulation gain value may be any value greater than the third amplitude modulation gain. For example, the second amplitude modulation gain value and the first amplitude modulation gain value may be within an interval specified by any two values of 1, 1.1, 1.2, 1.3, 1.4, 1.5, 1.6, 1.7, 1.8, 1.9, 2, 2.1, 2.2, and 2.4. The first amplitude modulation gain may be any value between 0 and 1. For example, the first amplitude modulation gain value may be within an interval specified by any two values of 0, 0.04, 0.08, 0.12, 0.16, 0.20, 0.24, 0.28, 0.32, 0.36, 0.40, 0.44, 0.48, 0.52, 0.56, 0.60, 0.64, 0.68, 0.72, 0.76, 0.80, 0.84, 0.88, 0.92, 0.96, and 1. As shown in FIG. 8E, the third amplitude modulation gain of the global modulation function $H_0(f)$ in the low-frequency region is around 1.1, the second amplitude modulation gain in the intermediate-frequency region is around 1.2, and the first amplitude modulation gain in the high-frequency region is around 0.6.

Further, when the high-frequency region is not connected to the intermediate-frequency region, the global spectrum modulation function $H_0(f)$ may further modulate the amplitude in the high-frequency region, so that a change of an amplitude modulation gain in the medium-high-frequency region may be smooth and continuous.

Further, when the intermediate-frequency region is not connected to the low-frequency region, the global spectrum modulation function $H_0(f)$ may further modulate an amplitude in the medium-low-frequency region, so that a change of an amplitude modulation gain in the medium-low-frequency region may be continuous.

The curve of the global modulation function $H_0(f)$ may be a smooth curve, or may not be a smooth curve. In engineering implementation, on a basis that the amplitude of the adjustment frame in the low-frequency to intermediate-frequency region is approximately equal to or greater than that of the original frame, the curve of the global modulation function $H_0(f)$ may be allowed to fluctuate within a small range, and the fluctuation has no impact on a decompression effect. For other forms of data than the video data, parameters of the global modulation function $H_0(f)$ may be set according to a receiver's sensitivity to the data. For different forms of data, the receiver's sensitivity to frequencies may also be different.

It should be noted that the obtaining of the adjustment frame by the data decompression device 300 based on the convolution result of the decoded frame may be implemented by using different decoding spectrum modulation functions and different processing means. For example, FIG. 3A and FIG. 3D are two different processing means for obtaining the adjustment frame. Decoding spectrum modulation functions for different methods may also be different. For ease of description, the decoding spectrum modulation function in FIG. 3A is defined as $H_2(f)$, and the decoding spectrum modulation function in FIG. 3D is defined as $H_{21}(f)$.

In some exemplary embodiments, the data decompression device 300 may directly use the convolution result of the decoded frame as the adjustment frame, as shown in FIG. 3A. In this case, a relationship between $P_3$ and $P_2$ may be expressed by using the following formula:

$$P_3 = H_2(f) \cdot P_2 \approx H_2(f) \cdot P_1 \approx H_2(f) \cdot H_1(f) \cdot P_0 \quad \text{formula (8)}$$

In this case, a relationship between $P_3$ and $P_0$ may be expressed by using the following formula:

$$\begin{cases} P_3 = H_2(f) \cdot H_1(f) \cdot P_0 \geq P_0, (f \leq f_0) \\ P_3 = H_2(f) \cdot H_1(f) \cdot P_0 < P_0, (f > f_0) \end{cases} \quad \text{formula (9)}$$

In this case, a relationship between the encoding spectrum modulation function $H_1(f)$ corresponding to the encoding convolution kernel and the decoding spectrum modulation function $H_2(f)$ corresponding to the decoding convolution kernel may be expressed by using the following formula:

$$\begin{cases} H_0(f) = H_1(f) \cdot H_2(f) \geq 1, (f \leq f_0) \\ H_0(f) = H_1(f) \cdot H_2(f) < 1, (f > f_0) \end{cases} \quad \text{formula (10)}$$

Therefore, the relationship between $H_1(f)$ and $H_2(f)$ may be expressed by using the following formula:

$$\begin{cases} H_2(f) \geq 1/H_1(f), (f \leq f_0) \\ H_2(f) < 1/H_1(f), (f > f_0) \end{cases} \quad \text{formula (11)}$$

Figure 9:
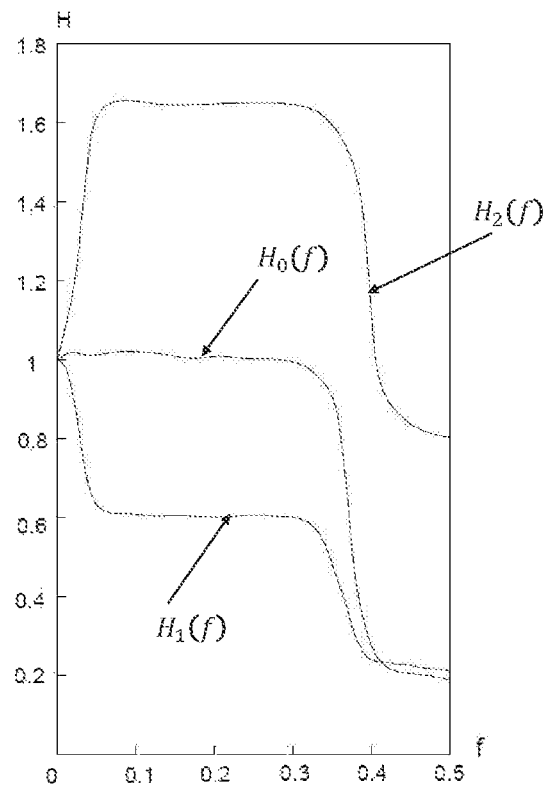
FIG. 9 is a graph of curves of a global modulation function $H_0(f)$, an encoding spectrum modulation function $H_1(f)$, and a decoding spectrum modulation function $H_2(f)$ according to some exemplary embodiments of this disclosure.

FIG. 9 is a graph of curves of a global modulation function $H_0(f)$, an encoding spectrum modulation function $H_1(f)$, and a decoding spectrum modulation function $H_2(f)$ according to some exemplary embodiments of this disclosure. A relationship between $H_0(f)$, $H_1(f)$, and $H_2(f)$ shown in FIG. 9 is a relationship expressed by the formula (10). As shown in FIG. 9, a horizontal axis is a normalized frequency f, and a vertical axis is an amplitude modulation gain H. Using the video data as an example, because human eyes are relatively sensitive to low-frequency to intermediate-frequency information, the global spectrum modulation function $H_0(f)$ completely retains or enhances the information in the low-frequency to intermediate-frequency region. An amplitude modulation gain of the global spectrum modulation function $H_0(f)$ in the low-frequency to intermediate-frequency region is greater than or approximately equal to 1, and the data of the adjustment frame in the low-frequency to intermediate-frequency region can be basically restored to the data of the original frame. Because human eyes are relatively insensitive to high-frequency information, the global spectrum modulation function $H_0(f)$ attenuates the information in the high-frequency region to suppress unnecessary high-frequency noise.

In some application scenarios, for example, reconnaissance scenarios, when information within a frequency interval $f > f_0$ also needs to be restored or enhanced, the relationship between $H_1(f)$ and $H_2(f)$ may be expressed by using the following formula:

$$\begin{cases} H_0(f) = H_1(f) \cdot H_2(f) \geq 1, (f \leq f_0) \\ H_0(f) = H_1(f) \cdot H_2(f) \geq 1, (f > f_0) \end{cases} \quad \text{formula (12)}$$

$$\begin{cases} H_2(f) \geq 1/H_1(f), (f \leq f_0) \\ H_2(f) \geq 1/H_1(f), (f > f_0) \end{cases} \quad \text{formula (13)}$$

It should be noted that the curves shown in FIG. 9 are only exemplary illustrations. A person skilled in the art should understand that the curves of $H_0(f)$, $H_1(f)$, and $H_2(f)$ are not limited to the forms shown in FIG. 9. All curves of $H_0(f)$, $H_1(f)$, and $H_2(f)$ that comply with the formula (10) or formula (12) fall within the scope of this disclosure. It should be noted that any linear combination of decoding spectrum modulation functions $H_2(f) = \Sigma_{i=1}^{n} k_i H_{2i}(f)$ or product combination of decoding spectrum modulation functions $H_2(f) = \Pi_{j=1}^{n} k_j H_{2j}(f)$, or a combination of a linear combination and a product combination that complies with the formula (10) or formula (12) falls within the scope of this disclosure, where $i \geq 1$, $H_2(f) = \Sigma_{i=1}^{n} k_i H_{2i}(f)$ represents a linear combination of n functions, $H_{2i}(f)$ represents an ith function, $k_i$ represents a weight corresponding to the ith function, $j \geq 1$, $H_2(f) = \Pi_{j=1}^{n} k_j H_{2j}(f)$ represents a product combination of the n functions, $k_j$ represents a weight corresponding to a jth function, and $H_{2j}(f)$ may be any function.

The data processing method P300 provided in this disclosure may further obtain compensation information of the decoded frame by using the decoding spectrum modulation function $H_{21}(f)$, and superimpose the compensation information of the decoded frame on the decoded frame to obtain the adjustment frame, as shown in FIG. 3D. The data decompression device 300 may restore or enhance the compensation information of the decoded frame by adjusting the spectrum modulation function $H_{21}(f)$, so that the data of the adjustment frame may be restored or enhanced. As shown in FIG. 3D, the data compression process is consistent with that of the method shown in FIG. 3A. Details are not described again herein. As shown in FIG. 3D, to enable the data decompression device 300 to obtain the adjustment frame, step S344-6 may include the following steps performed by the at least one decompression processor of the data decompression device 300.

S344-7. Obtain a compensation frame based on the convolution result of the decoded frame.

For ease of description, the compensation frame is defined as $P_C$. The compensation frame is a compensation for the decoded frame, and the compensation frame and the decoded frame are complementary to each other. Therefore, the curve of $H_{21}(f)$ may be designed to express compensation information of the decoded frame. The compensation frame $P_C$ may be expressed by using the following formula:

$$\begin{cases} P_C = H_{21}(f) \cdot H_1(f) \cdot P_0, (f \leq f_0) \\ P_C = H_{21}(f) \cdot H_1(f) \cdot P_0, (f > f_0) \end{cases} \quad \text{formula (14)}$$

S344-8. Superimpose the compensation frame $P_C$ on the decoded frame $P_2$ to obtain the adjustment frame $P_3$.

In this case, the adjustment frame $P_3$ may be expressed by using the following formula:

$$\begin{cases} P_3 = (H_1(f) + aH_{21}(f) \cdot H_1(f)) \cdot P_0 \geq P_0, (f \leq f_0) \\ P_3 = (H_1(f) + aH_{21}(f) \cdot H_1(f)) \cdot P_0 < P_0, (f > f_0) \end{cases} \quad \text{formula (15)}$$

where a is an enhancement coefficient, indicating an extent to which the original frame $P_0$ is enhanced; and a may be a constant or a function.

In this case, a relationship between the encoding spectrum modulation function $H_1(f)$ corresponding to the encoding convolution kernel and the decoding spectrum modulation function $H_{21}(f)$ corresponding to the decoding convolution kernel may be expressed by using the following formula:

$$\begin{cases} H_0(f) = aH_1(f) \cdot H_{21}(f) + H_1(f) \geq 1, (f \leq f_0) \\ H_0(f) = aH_1(f) \cdot H_{21}(f) + H_1(f) < 1, (f > f_0) \end{cases} \quad \text{formula (16)}$$

$H_0(f)$ may be quickly adjusted by adjusting the enhancement coefficient $\alpha$, without changing $H_1(f)$ and $H_{21}(f)$.

Therefore, the relationship between $H_1(f)$ and $H_{21}(f)$ may be expressed by using the following formula:

$$\begin{cases} H_{21}(f) \geq (1 - H_1(f))/aH_1(f), (f \leq f_0) \\ H_{21}(f) < (1 - H_1(f))/aH_1(f), (f > f_0) \end{cases} \quad \text{formula (17)}$$

As described above, if the original frame is convolved in a plurality of directions, the decoded frame is also convolved in a plurality of directions, and the convolution directions and orders of the decoded frame are opposite to the convolution directions and orders of the original frame. That is, if the original frame is firstly convolved in the vertical direction and then convolved in the horizontal direction, the decoded frame is firstly convolved in the horizontal direction and then convolved in the vertical direction. It should be noted that the decoded frame needs to be first convolved in the horizontal direction to obtain compensation information in the horizontal direction, and after the compensation information of the decoded frame in the horizontal direction is superimposed on the decoded frame, the decoded frame is convolved in the vertical direction to obtain compensation information in the vertical direction, and then the compensation information of the decoded frame in the vertical direction is superimposed on the decoded frame.

Figure 10A:
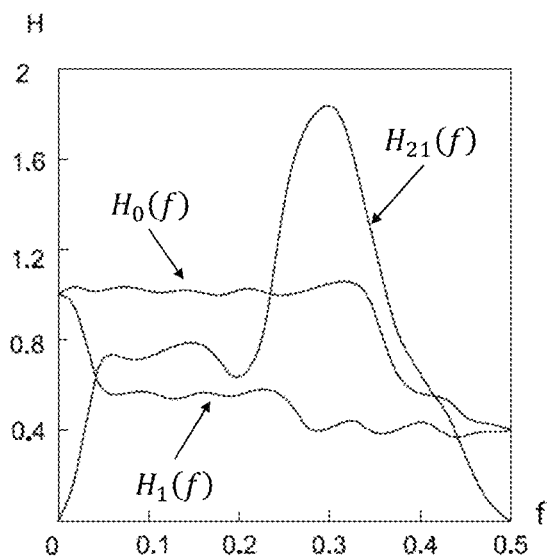
FIG. 10A is a graph of curves of a global modulation function $H_0(f)$, an encoding spectrum modulation function $H_1(f)$, and a decoding spectrum modulation function $H_{21}(f)$ in a normal mode according to some exemplary embodiments of this disclosure.
Figure 10B:
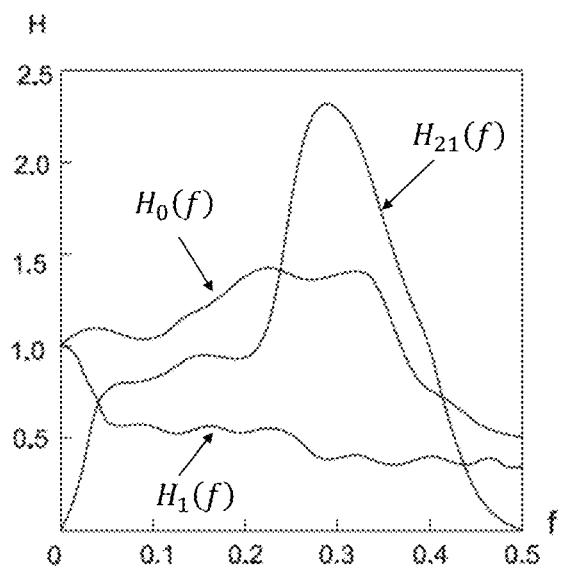
FIG. 10B is a graph of curves of a global modulation function $H_0(f)$, an encoding spectrum modulation function $H_1(f)$, and a decoding spectrum modulation function $H_{21}(f)$ in an enhanced mode according to some exemplary embodiments of this disclosure.

FIG. 10A is a graph of curves of a global modulation function $H_0(f)$, an encoding spectrum modulation function $H_1(f)$, and a decoding spectrum modulation function $H_{21}(f)$ in a normal mode according to some exemplary embodiments of this disclosure. FIG. 10B is a graph of curves of a global modulation function $H_0(f)$, an encoding spectrum modulation function $H_1(f)$, and a decoding spectrum modulation function $H_{21}(f)$ in an enhanced mode according to some exemplary embodiments of this disclosure. In FIG. 10A and FIG. 10B, a=1 is used as an example for description. A relationship between $H_0(f)$, $H_1(f)$, and $H_{21}(f)$ shown in FIG. 10A and FIG. 10B is a relationship expressed by the formula (16). In FIG. 10A and FIG. 10B, a horizontal axis is a normalized frequency f, and a vertical axis is an amplitude modulation gain H. Taking the video data as an example, because human eyes are relatively sensitive to low-frequency to intermediate-frequency information, the global spectrum modulation function $H_0(f)$ may retain or enhance the information in the low-frequency to intermediate-frequency region. An amplitude modulation gain of the global spectrum modulation function $H_0(f)$ in the low-frequency to intermediate-frequency region may be greater than or equal to 1. Because human eyes are relatively insensitive to high-frequency information, the global spectrum modulation function $H_0(f)$ attenuates the information in the high-frequency region to reduce unnecessary high-frequency noise possibly generated in the adjustment frame. As shown in FIG. 10A, the global spectrum modulation function $H_0(f)$ in the low-frequency to intermediate-frequency region is approximately equal to 1; and the global spectrum modulation function $H_0(f)$ performs spectrum modulation on the adjustment frame in the normal mode, that is, the information in the low-frequency to intermediate-frequency region is fully retained in the global spectrum modulation function $H_0(f)$, and the data of the adjustment frame may be basically restored to the data of the original frame. As shown in FIG. 10B, the global spectrum modulation function $H_0(f)$ in the low-frequency region is approximately equal to 1; and the global spectrum modulation function $H_0(f)$ in the intermediate-frequency region is greater than 1. The global spectrum modulation function $H_0(f)$ performs spectrum modulation in the enhanced mode on the intermediate-frequency region in the adjustment frame, that is, the global spectrum modulation function $H_0(f)$ enhances information in the intermediate-frequency region. The data in the intermediate-frequency region in the adjustment frame is enhanced in comparison with the data in the intermediate-frequency region in the original frame. It should be noted that the curves shown in FIG. 10A and FIG. 10B are only exemplary illustrations. A person skilled in the art should understand that the curves of $H_0(f)$, $H_1(f)$, and $H_{21}(f)$ are not limited to the forms shown in FIG. 10A and FIG. 10B. All curves of $H_0(f)$, $H_1(f)$, and $H_{21}(f)$ that comply with the formula (16) fall within the protection scope of this disclosure. It should be noted that any linear combination of decoding spectrum modulation functions $H_{21}(f)=\Sigma_{i=1}^{n} k_i H_{21i}(f)$ or product combination of decoding spectrum modulation functions $H_{21}(f)=\Pi_{j=1}^{n} k_j H_{21j}(f)$, or a combination of a linear combination and a product combination that complies with the formula (16) falls within the protection scope of this disclosure, where i≥1, $H_{21}(f)=\Sigma_{i=1}^{n} k_i H_{21i}(f)$ represents a linear combination of n functions, $H_{21i}(f)$ represents an ith function, $k_i$ represents a weight corresponding to the ith function, j≥1, $H_{21}(f)=\Pi_{j=1}^{n} k_j H_{21j}(f)$ represents a product combination of the n functions, $k_j$ represents a weight corresponding to a jth function, and $H_{21j}(f)$ may be any function.

Figures 11, 12, 13:
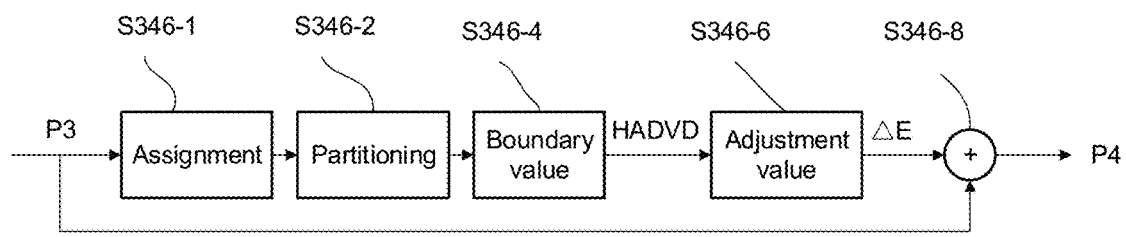
FIG. 11 is a parameter table of a decoding convolution kernel in a normal mode according to some exemplary embodiments of this disclosure.
FIG. 12 is a parameter table of a decoding convolution kernel in an enhanced mode according to some exemplary embodiments of this disclosure.
FIG. 13 is a flowchart of a boundary adjustment according to some exemplary embodiments of this disclosure.

FIG. 11 is a parameter table of a decoding convolution kernel in a normal mode according to some exemplary embodiments of this disclosure. FIG. 11 exemplarily lists parameters of a decoding convolution kernel in the normal mode, where each row in FIG. 11 represents a decoding convolution kernel in the normal mode. The decoding convolution kernel in the normal mode is obtained by performing a Fourier transform on the decoding spectrum modulation function $H_{21}(f)$ obtained based on the global spectrum modulation function $H_0(f)$ in the normal mode. That is, the decoding spectrum modulation function $H_{21}(f)$ is obtained based on a correspondence thereof to $H_0(f)=1$. For a video image of 8 bits, to ensure that grayscale values of pixels in the adjustment frame obtained after the decoding convolution are within a range of 0 to 255, it is necessary to divide the convolution result by 256. The data decompression device 300 uses the decoding convolution kernel in a normal mode shown in FIG. 11, so that the data of the adjustment frame may be basically consistent with the data of the original frame. FIG. 11 is only an exemplary illustration. A person skilled in the art should know that the decoding convolution kernel in a normal mode is not limited to the parameters shown in FIG. 11. All decoding convolution kernels that can restore an amplitude of the decoded frame in the low-frequency to intermediate-frequency region in a frequency domain fall within the protection scope of this disclosure.

FIG. 12 is a parameter table of a decoding convolution kernel in an enhanced mode according to some exemplary embodiments of this disclosure. Each row in FIG. 12 represents a decoding convolution kernel in the enhanced mode. The decoding convolution kernel in the enhanced mode is obtained by performing a Fourier transform on the decoding spectrum modulation function $H_{21}(f)$ obtained based on the global spectrum modulation function $H_0(f)$ in the enhanced mode. That is, the decoding spectrum modulation function $H_{21}(f)$ is obtained based on a correspondence thereof to $H_0(f) > 1$. For a video image, to ensure that grayscale values of pixels in the adjustment frame obtained after the decoding convolution are within a range of 0 to 255, it is necessary to divide the convolution result by 256. The data decompression device 300 may use the decoding convolution kernel in the enhanced mode shown in FIG. 12, so that the data of the adjustment frame may be enhanced. FIG. 12 is only an exemplary illustration. A person skilled in the art should know that the decoding convolution kernel in an enhanced mode is not limited to the parameters shown in FIG. 12. All decoding convolution kernels that may decrease an amplitude of the decoded frame in the high-frequency region in a frequency domain and enhance an amplitude of the decoded frame in the low-frequency to intermediate-frequency region fall within the scope of this disclosure. When decompressing the compressed frame, the data decompression device 300 may select the decoding convolution kernel in a normal mode or the decoding convolution kernel in an enhanced mode as the decoding convolution kernel as needed.

S346. Perform a boundary adjustment on the adjustment frame to obtain the decompressed frame.

After the decoding spectrum modulation and decompression are performed on the data that has undergone the encoding spectrum modulation and compression, a ringing effect may occur, which may have an impact on a visual effect. The ringing effect refers to that in image processing, when spectrum modulation processing is performed on one image, if a selected spectrum modulation function is subjected to a fast change, "ringing" occurs in the image. The "ringing" is an oscillation that accompanies a drastic grayscale change in an output image, as if an air oscillation is generated after ringing of a bell. The ringing effect often occurs at a boundary of an image. Therefore, in this disclosure, to improve quality and definition of the decompressed data, a boundary adjustment may be performed on the decompressed data to effectively eliminate the ringing effect. FIG. 13 is a flowchart of a boundary adjustment according to some exemplary embodiments of this disclosure. As shown in FIG. 13, step S346 may include the following steps performed by the at least one decompression processor 320 of the data decompression device 300.

S346-1. Assign values to elements whose element values are beyond a preset range in the adjustment frame, so that the elements are included in the preset range.

The boundary adjustment refers to performing an adjustment based on element values of elements in the adjustment frame, so as to eliminate the ringing effect. The elements of the frame are the smallest units that make up the frame. Taking the video data as an example, an element of the image frame may be a pixel of the image. An element value of the image frame may be a grayscale value of the pixel of the image, or may be an RGB value, or a HIS value, or an HSV value, or the like of the pixel of the image. When the adjustment frame is an audio, the element may be a minimum unit that makes up the audio, for example, an audio sampling point at one sampling frequency. The following uses an example for description, where the adjustment frame is video data and the element values are grayscale values of pixels in the image.

Grayscale values of the pixels of the image are generally within 0 to 255. As described above, the decoding spectrum modulation can restore or even enhance the data of the adjustment frame in the low-frequency to intermediate-frequency region, but the encoding spectrum modulation and the decoding spectrum modulation may attenuate the data of the adjustment frame in the high-frequency region. Therefore, after the adjustment frame undergoes the data compression and decompression processing, grayscale values of some pixels may be beyond a range of 0-255. Therefore, to facilitate the boundary adjustment on the adjustment frame so that the grayscale values of the adjustment frame are within 0 to 255, it is necessary to assign values to the adjustment frame, so that the element values (that is, the grayscale values) of the adjustment frame are within a preset range. The preset range includes a range defined by a first critical value and a second critical value, where the first critical value is greater than the second critical value. The preset range may be 0 to 255, the first critical value is 255, and the second critical value is 0. Certainly, the preset range may also be set according to an application scenario of the video data. For example, in a dark background, a minimum value of the preset range may be properly adjusted, so that the preset range is adjusted to 10-255. Certainly, the preset range may also be other ranges, for example, 16-240, 20-250, 30-250, and 40-250. Before the boundary adjustment is performed on the adjustment frame, element values are assigned to the adjustment frame, so that the element values of the adjustment frame are within the preset range. In this way, an amount of calculation can be reduced during the boundary adjustment and working efficiency is improved. Step S346-1 may include: assigning the first critical value to an element whose element value is greater than the first critical value in the adjustment frame; and assigning the second critical value to an element whose element value is less than the second critical value in the adjustment frame. For elements whose element values are between the first critical value and the second critical value in the adjustment frame, corresponding element values are retained and no reassignment is performed.

S346-2. Partition the adjustment frame based on the element values of the adjustment frame.

The adjustment frame may be partitioned into three regions based on the element values of the adjustment frame: a pitted region, a salient region, and a transition region. The pitted region includes an element(s) corresponding to a local minimum value. The salient region includes an element(s) corresponding to a local maximum value. The transition region includes a region other than the pitted region and the salient region. Specifically, in step S346-2, elements of the adjustment frame may be partitioned point by point. For ease of description, an element value corresponding to an element to be partitioned is defined as $d_0$, and an element value corresponding to an element adjacent to $d_0$ is defined as $d_k$, where k=-n to n, and n is a positive integer, for example, n may be 1, or may be 2, or may be 3 or an integer greater than 3; $d_k$ and $d_0$ may be adjacent in at least one of a horizontal direction, a vertical direction, or an oblique direction; and an adjacency direction of $d_k$ and $d_0$ is consistent with a decoding convolution direction of the decoded frame.

When $d_0 < d_k$, $d_0$ is a minimum element value within a local range, and therefore $d_0$ is defined as an element value of the pitted region.

When $d_0 > d_k$, $d_0$ is a maximum element value within the local range, and therefore $d_0$ is defined as an element value of the salient region.

When $d_0$ belongs to neither the pitted region nor the salient region, $d_0$ is defined as an element value of the transition region.

A ringing effect often occurs in a region with a drastic image grayscale change, that is, near a boundary region of an image. As a result, brightness of a dark element value (pitted region) near the boundary region is reduced, or brightness of a bright element value (salient region) near the boundary region is increased, causing a visual oscillation effect. Therefore, a boundary adjustment needs to be performed on the adjustment frame, so that an original grayscale value is restored. To be specific, through the boundary adjustment, brightness of the dark element value (pitted region) near the boundary region is increased and restored to the original grayscale value, or brightness of the bright element value (salient region) near the boundary region is reduced and restored to the original grayscale value. Therefore, boundary detection needs to be performed on the pitted region and salient region of the adjustment frame to detect boundaries in the adjustment frame, and then the boundary adjustment may be performed on boundaries of the pitted region and the salient region separately.

S346-4. Obtain a boundary value corresponding to each element in the pitted region and the salient region in the adjustment frame.

The boundary value (HADVD, higher absolute differential value difference) includes a combination of a forward differential $HADVD_f$ and a backward differential $HADVD_b$ of the current element $d_0$.

The forward differential $HADVD_f$ includes a differential operation performed between the current element $d_0$ and a forward adjacent element. The backward differential $HADVD_b$ includes a differential operation performed between the current element $d_0$ and a backward adjacent element. A differential operation direction of the forward differential $HADVD_f$ and the backward differential $HADVD_b$ includes a differential operation performed in at least one of the vertical direction, the horizontal direction, or the oblique direction. The differential operation direction is the same as the convolution direction of the decoded frame. The forward differential $HADVD_f$ may be expressed by using the following formula:

$$HADVD_f = \sum_{k=-n}^{-1} w_k |d_0 - d_k| \qquad \text{formula (18)}$$

The backward differential $HADVD_b$ may be expressed by using the following formula:

$$HADVD_b = \sum_{k=1}^{n} w_k |d_0 - d_k| \qquad \text{formula (19)}$$

In the formulas, $w_k$ indicates a weighting coefficient of the forward differential $HADVD_f$ and the backward differential $HADVD_b$, and may be any value between 0 and 1. For example, when n=3, $w_k$=[1 1 1]. In this case, a third-order forward differential value and a third-order backward differential value may be calculated. A difference between the current element $d_0$ and an adjacent element may be calculated by calculating the forward differential $HADVD_f$ and the backward differential $HADVD_b$. The larger the difference, the closer the current element $d_0$ to the boundary.

The combination of the forward differential $HADVD_f$ and the backward differential $HADVD_b$ may include one of a maximum weighted value $HADVD_{max}$ and an absolute difference $HADVD_{abd}$. The maximum weighted value $HADVD_{max}$ is a weighted value of a maximum value in the forward differential $HADVD_f$ and the backward differential $HADVD_b$ of the current element $d_0$, and may be expressed by using the following formula:

$$HADVD_{max} = h \cdot \max(HADVD_f, HADVD_b) \qquad \text{formula (20)}$$

where h is a weighting coefficient, h may be any value between 0 and 1, and h may be obtained by training based on plenty of image sample data or may be set to a value based on experience.

The absolute difference $HADVD_{abd}$ is an absolute value of a difference between the forward differential $HADVD_f$ and the backward differential $HADVD_b$ of the current element $d_0$, and may be expressed by using the following formula:

$$HADVD_{abd} = |HADVD_b - HADVD_f| \qquad \text{formula (21)}$$

The boundary value HADVD includes a larger one of the maximum weighted value $HADVD_{max}$ and the absolute difference $HADVD_{abd}$. The boundary value HADVD may be expressed by using the following formula:

$$HADVD = \max(HADVD_{max}, HADVD_{abd}) \qquad \text{formula (22)}$$

The absolute difference $HADVD_{abd}$ and the maximum weighted value $HADVD_{max}$ are combined to accurately recognize the boundary in the image. The larger the boundary value HADVD, that the closer the current element $d_0$ to the boundary.

S346-6. Adjust, based on a preset boundary threshold THD, an element whose boundary value HADVD is greater than the boundary threshold THD, in the pitted region or the salient region to obtain an adjustment value $\Delta E$.

When the boundary value HADVD is greater than or equal to the boundary threshold THD, an element corresponding to the boundary value HADVD may be defined as a boundary region, and a boundary adjustment needs to be performed. The boundary threshold THD may be obtained by training based on plenty of image sample data. As described above, for the boundary adjustment of the pitted region, an element value corresponding to the element of the pitted region needs to be increased. For the boundary adjustment of the salient region, an element value corresponding to the element of the salient region needs to be decreased. Step S346-6 may include:

Finite-order linear combining is performed on a ratio of the boundary value HADVD corresponding to the element in the pitted region to the boundary threshold THD, so as to obtain an adjustment value $\Delta E_L$ of the pitted region. The adjustment value $\Delta E_L$ of the pitted region may be expressed by using the following formula:

$$\Delta E_L = g_1 \cdot \left[\frac{HADVD}{THD}\right] + g_2 \cdot \left(\left[\frac{HADVD}{THD}\right]\right)^2 + \ldots + g_m \cdot \left(\left[\frac{HADVD}{THD}\right]\right)^m + q \qquad \text{formula (23)}$$

In the formula, m is a positive integer greater than 1

$$\left\lfloor \frac{HADVD}{THD} \right\rfloor$$

indicates a minimum integer not greater than $$\frac{HADVD}{THD},$$

$g_m$ is a weighting coefficient, and q is a modification parameter. The order of the linear combination, the weighting coefficient $g_m$, and the modification parameter q may be obtained by training based on plenty of image sample data. For the video data, to ensure that the grayscale value of the image is an integer between 0 and 255, a rounding operation may be performed on $\Delta E_L$. When the boundary value HADVD is less than the boundary threshold THD, $$\left\lfloor \frac{HADVD}{THD} \right\rfloor = 0,$$

no boundary adjustment needs to be performed.

Finite-order linear combining is performed on a ratio of the boundary value HADVD corresponding to the element in the salient region to the boundary threshold THD and a result is negated to obtain an adjustment value $\Delta E_H$ of the salient region. The adjustment value $\Delta E_H$ of the salient region may be expressed by using the following formula:

formula(24)

$$\Delta E_H = -\left( g_1 \cdot \left\lfloor \frac{HADVD}{THD} \right\rfloor + g_2 \cdot \left( \left\lfloor \frac{HADVD}{THD} \right\rfloor \right)^2 + \ldots + g_m \cdot \left( \left\lfloor \frac{HADVD}{THD} \right\rfloor \right)^m + q \right)$$

In the formula, m is a positive integer greater than 1

$$\left\lfloor \frac{HADVD}{THD} \right\rfloor$$

indicates a minimum integer not greater than $$\frac{HADVD}{THD},$$

$g_m$ is a weighting coefficient, and q is a modification parameter. The order of the linear combination, the weighting coefficient $g_m$, and the modification parameter q may be obtained by training based on plenty of image sample data. For the video data, to ensure that the grayscale value of the image is an integer between 0 and 255, a rounding operation needs to be performed on $\Delta E_H$. When the boundary value HADVD is less than the boundary threshold THD, $$\left\lfloor \frac{HADVD}{THD} \right\rfloor = 0,$$

and no boundary adjustment needs to be performed. As described above, for the boundary adjustment of the salient region, the element value corresponding to the element of the salient region needs to be decreased. Therefore, $\Delta E_H$ may be set to a negative value.

S346-8. Adjust the adjustment frame based on the adjustment value $\Delta E$ to obtain the decompressed frame.

Specifically, step S346-8 includes superimposing the adjustment value $\Delta E$ on the element value corresponding to the adjustment frame to obtain the decompressed frame.

It should be noted that when the decoding convolution is performed on the decoded frame in a plurality of directions, the boundary adjustment needs to be performed on the adjustment frame in a plurality of directions, and an order of the boundary adjustment is the same as the decoding convolution order of the decoded frame. That is, if the decoded frame is subjected to the decoding convolution in the horizontal direction first and then the decoding convolution in the vertical direction, the adjustment frame is subjected to the boundary adjustment in the horizontal direction first and then the boundary adjustment in the vertical direction.

Figure 14A:
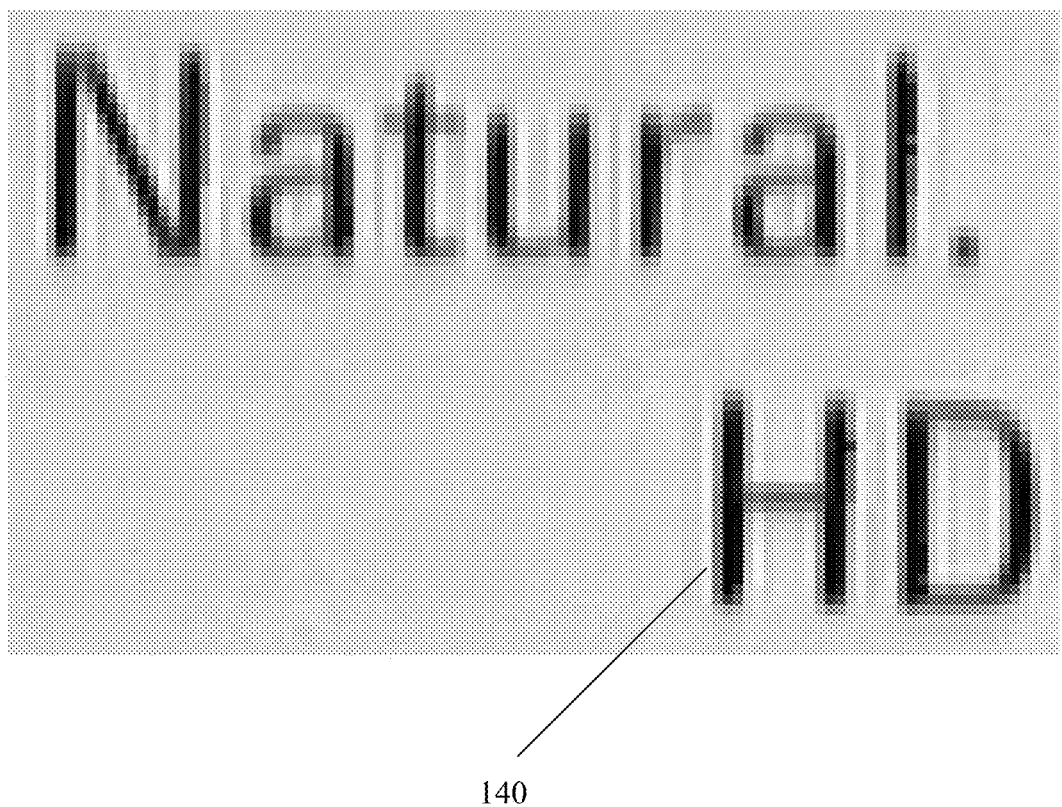
FIG. 14A is an exemplary diagram without a boundary adjustment according to some exemplary embodiments of this disclosure.
Figure 14B:
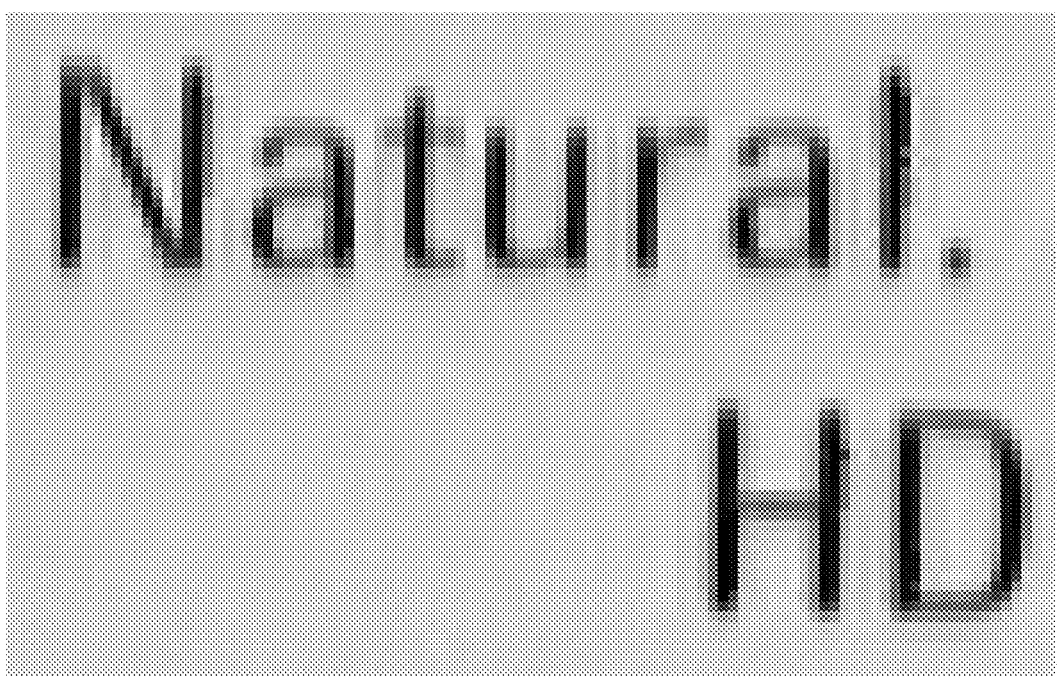
FIG. 14B is an exemplary diagram with a boundary adjustment according to some exemplary embodiments of this disclosure.

FIG. 14A is an exemplary diagram without a boundary adjustment according to some exemplary embodiments of this disclosure. FIG. 14B is an exemplary diagram with a boundary adjustment according to some exemplary embodiments of this disclosure. A highlighted region 140 in FIG. 14A is a ringing effect. By comparing FIG. 14A with FIG. 14B, it is found that the boundary adjustment method in this disclosure can effectively eliminate the ringing effect.

The decompressed frame may be obtained by performing the boundary adjustment on the adjustment frame. Therefore, the decompressed frame and the adjustment frame that is calculated by using the decoding spectrum modulation function $H_2(f)$ and the global spectrum modulation function $H_0(f)$ are generally consistent in nature. To be specific, amplitudes of both the decompressed frame and the adjustment frame at any frequency in the low-frequency to intermediate-frequency region are approximately equal to or greater than or equal to the amplitude of the original frame, so that definition of the decompressed frame in the low-frequency to intermediate-frequency region may be restored or even enhanced. In some exemplary embodiments, for example, as shown in FIG. 8B, FIG. 8D, and FIG. 8E, amplitudes of both the decompressed frame and the adjustment frame are smoothly decreased in comparison with the amplitude of the original frame in the high-frequency region. In some exemplary embodiments, for example, as shown in FIG. 8C, FIG. 8D, and FIG. 8E, amplitudes of both the decompressed frame and the adjustment frame are smoothly increased in comparison with the amplitude of the original frame in the intermediate-frequency region. In some exemplary embodiments, for example, as shown in FIG. 8E, amplitudes of both the decompressed frame and the adjustment frame are smoothly increased in comparison with the amplitude of the original frame in the low-frequency region, where the increase of the amplitudes of both the decompressed frame and the adjustment frame in the intermediate-frequency region is greater than the increase of the amplitudes thereof in the low-frequency region.

In summary, when compressing the original data, the data processing system 100 provided in this disclosure performs the method P200 by using the data compression device 200, and uses the encoding convolution kernel to perform the encoding spectrum modulation on the original frame in the original data, so that the amplitude of the original frame in the low-frequency to high-frequency region in a frequency domain is smoothly decreased, thereby reducing the data information in the original frame, improving encoding efficiency, reducing a compressed data volume, and improving the data compression efficiency and data transmission efficiency. When decompressing the compressed frame, the data processing system 100 provided in this disclosure performs the method P300 by using the data decompression device 300, performs the decoding spectrum modulation on the compressed frame by using the decoding convolution kernel, and performs the boundary adjustment, where the decoding convolution kernel corresponds to the encoding convolution kernel, so that the low-frequency to intermediate-frequency data of the decompressed frame is restored or even enhanced and that the amplitude of the decompressed frame in the low-frequency to intermediate-frequency region is approximately equal to, or greater than or equal to the amplitude of the original frame, and the boundary adjustment can effectively eliminate the ringing effect after the decoding spectrum modulation and make the decompressed frame clearer. The method and system can improve the data compression efficiency, and improve transmission efficiency, while improving definition of the decompressed data.

In addition, this disclosure provides a non-transitory storage medium. The non-transitory storage medium stores at least one set of executable instructions for data processing. When the executable instructions are executed by a processor, the executable instructions instruct the processor to implement steps of the data processing method P200. In some possible implementations, each aspect of this disclosure may be further implemented in a form of a program product, where the program product includes program code. When the program product runs on the data compression device 200, the program code is used to enable the data compression device 200 to perform the data processing steps described in this disclosure. The program product for implementing the foregoing method may use a portable compact disc read-only memory (CD-ROM) and include program code. In addition, the program product can run on the data compression device 200, for example, run on a personal computer. However, the program product in this disclosure is not limited thereto. In this disclosure, a readable storage medium may be any tangible medium containing or storing a program, and the program may be used by or in combination with an instruction execution system (for example, the compression processor 220). The program product may use any combination of one or more readable media. The readable medium may be a readable signal medium or a readable storage medium. For example, the readable storage medium may be but is not limited to an electronic, magnetic, optical, electromagnetic, infrared, or semi-conductor system, apparatus, or device, or any combination thereof. More specific examples of the readable storage medium include: an electrical connection with one or more conducting wires, a portable disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any appropriate combination thereof. The computer-readable storage medium may include a data signal propagated in a baseband or as part of a carrier, where the data signal carries readable program code. The propagated data signal may be in a plurality of forms, including but not limited to an electromagnetic signal, an optical signal, or any appropriate combination thereof. Alternatively, the readable storage medium may be any readable medium other than the readable storage medium. The readable medium may send, propagate, or transmit a program to be used by or in combination with an instruction execution system, apparatus, or device. The program code contained in the readable storage medium may be transmitted by using any appropriate medium, including but not limited to wireless, wired, optical cable, RF, or the like, or any appropriate combination thereof. The program code for performing operations in this disclosure may be compiled in any combination of one or more programming languages. The programming languages include object-oriented programming languages such as Java and C++, and further include conventional procedural programming languages such as a "C" language or a similar programming language. The program code may be completely executed on the data compression device 200, partially executed on the data compression device 200, executed as an independent software package, partially executed on the data compression device 200 and partially executed on a remote computing device, or completely executed on a remote computing device. In a case in which a remote computing device is used, the remote computing device may be connected to the data compression device 200 through the transmission medium 120, or may be connected to an external computing device.

Specific embodiments of this disclosure have been described above. Other embodiments also fall within the scope of the appended claims. In some cases, actions or steps described in the claims may be performed in an order different from orders in the exemplary embodiments and still achieve expected results. In addition, the processes depicted in the drawings do not necessarily require a specific order or sequence to achieve the expected results. In some implementations, multitask processing and parallel processing are also possible or may be advantageous.

In summary, after reading this detailed disclosure, a person skilled in the art may understand that the foregoing detailed disclosure may be presented by using examples only, and may not be restrictive. A person skilled in the art may understand that this disclosure is intended to cover various reasonable changes, improvements, and modifications to the embodiments, although this is not explicitly stated herein. These changes, improvements, and modifications are intended to be made in this disclosure and are within the spirit and scope of the exemplary embodiments of this disclosure.

In addition, some terms in this disclosure have been used to describe the embodiments of this disclosure. For example, "one embodiment", "an embodiment", and/or "some embodiments" mean/means that a specific feature, structure, or characteristic described with reference to the embodiments may be included in at least one embodiment of this disclosure. Therefore, it can be emphasized and should be understood that in various parts of this disclosure, two or more references to "an embodiment" or "one embodiment" or "an alternative embodiment" do not necessarily all refer to the same embodiment. Further, specific features, structures, or characteristics may be appropriately combined in one or more embodiments of this disclosure.

It should be understood that in the foregoing description of the embodiments of this disclosure, to help understand one feature and for the purpose of simplifying this disclosure, various features in this disclosure are combined in a single embodiment, single drawing, or description thereof. However, this does not mean that the combination of these features is necessary. It is entirely possible for a person skilled in the art to extract some of the features as a separate embodiment for understanding when reading this disclosure. In other words, an embodiment of this disclosure may also be understood as the integration of a plurality of sub-embodiments. It is also true when content of each sub-embodiment is less than all features of a single embodiment disclosed above.

Each patent, patent application, patent application publication, and other materials cited herein, such as articles, books, disclosures, publications, documents, and materials, can be incorporated herein by reference, which are applicable to all content used for all purposes, except for any history of prosecution documents associated therewith, any identical, or any identical prosecution document history, which may be inconsistent or conflicting with this document, or any such subject matter that may have a restrictive effect on the broadest scope of the claims associated with this document now or later. For example, if there is any inconsistency or conflict in descriptions, definitions, and/or use of a term associated with this document and descriptions, definitions, and/or use of the term associated with any material, the term in this document shall prevail.

Finally, it should be understood that the implementation solutions of this application disclosed herein illustrate the principles of the implementation solutions of this disclosure. Other modified embodiments also fall within the scope of this disclosure. Therefore, the embodiments disclosed in this disclosure are merely exemplary and not restrictive. A person skilled in the art may use alternative configurations to implement the application in this disclosure according to the embodiments of this disclosure. Therefore, the embodiments of this disclosure are not limited to those embodiments specifically described in this disclosure.

What is claimed is:

1. A system, comprising:
   at least one storage medium, including at least a set of instructions for data processing; and
   at least one processor in communication with the at least one storage medium, wherein during operation the at least one processor executes the set of instructions to:
   obtain compressed data, the compressed data including a compressed frame obtained by performing data compression on an original frame, wherein the compressed frame includes compressed predictive data and residual data, and the data compression includes encoding spectrum modulation; and
   perform data decompression on the compressed frame to obtain a decompressed frame, including:
   perform decoding spectrum modulation and a boundary adjustment on an under-decompression-frame to obtain the decompressed frame, so as to eliminate a ringing effect, wherein:
   the under-decompression-frame includes any frame of the compressed frame as well as the compressed frame in any data state during the performing of data decompression before obtaining the decompressed frame based on the predictive data and the residual data, and
   the decoding spectrum modulation is related to the encoding spectrum modulation, so that an amplitude of the decompressed frame at any frequency in a region from low-frequency to intermediate-frequency is not less than a preset percentage of an amplitude of the original frame in a corresponding frequency in the region from low-frequency region to intermediate-frequency.

2. The system according to claim 1, wherein the decoding spectrum modulation corresponds to the encoding spectrum modulation, so that the amplitude of the decompressed frame in a region of intermediate-frequency is smoothly increased in comparison with the corresponding amplitude of the original frame in the region of intermediate-frequency.

3. The system according to claim 2, wherein
   the decoding spectrum modulation corresponds to the encoding spectrum modulation, so that the amplitude of the decompressed frame in a region of low-frequency is smoothly increased in comparison with the corresponding amplitude of the original frame in the region of low-frequency, and
   the increase of the amplitude of the decompressed frame in the region of intermediate-frequency is greater than the increase of the amplitude of the decompressed frame in the region of low-frequency.

4. The system according to claim 2, wherein the decoding spectrum modulation corresponds to the encoding spectrum modulation, so that the amplitude of the decompressed frame in a region of high-frequency is smoothly decreased in comparison with the corresponding amplitude of the original frame in the region of high-frequency.

5. The system according to claim 1, wherein to perform the data decompression on the compressed frame, the at least one processor further execute the set of instructions to:
   decode the compressed frame based on the predictive data and the residual data to obtain a decoded frame, wherein the under-decompression-frame includes the decoded frame;
   perform the decoding spectrum modulation on the decoded frame to obtain an adjustment frame; and
   perform a boundary adjustment on the adjustment frame to obtain the decompressed frame.

6. The system according to claim 5, wherein to perform the decoding spectrum modulation on the decoded frame, the at least one processor further execute the set of instructions to:
   determine a frame type of the decoded frame, wherein the frame type includes at least one of an intra predictive frame, a forward predictive frame, or a bidirectional predictive frame;
   obtain a decoding convolution kernel based on the frame type of the decoded frame to convolve the decoded frame;
   obtain a compensation frame based on the convolution result, wherein the compensation frame is a compensation for the decoded frame, and the compensation frame and the decoded frame are complementary to each other; and
   superimpose the compensation frame on the decoded frame to obtain the adjustment frame.

7. The system method according to claim 6, wherein when the decoded frame is the bidirectional predictive frame:
   the decoding convolution kernel corresponding to the decoded frame is the same as a decoding convolution kernel corresponding to a reference frame with highest attenuation among closest adjacent reference frames in two directions, or
   the decoding convolution kernel corresponding to the decoded frame is an average value of decoding convolution kernels corresponding to closest adjacent reference frames in two directions.

8. A data processing method, comprising:
   obtaining compressed data, the compressed data including a compressed frame obtained by performing data compression on an original frame, wherein the compressed frame includes compressed predictive data and residual data, and the data compression includes encoding spectrum modulation; and performing data decompression on the compressed frame to obtain a decompressed frame, including:

performing decoding spectrum modulation and a boundary adjustment on an under-decompression-frame to obtain the decompressed frame, so as to eliminate a ringing effect, wherein:

the under-decompression-frame includes any frame of the compressed frame as well as the compressed frame in any data state during the performing of data decompression before obtaining the decompressed frame based on the predictive data and the residual data, and the decoding spectrum modulation is related to the encoding spectrum modulation, so that an amplitude of the decompressed frame at any frequency in a region from low-frequency to intermediate-frequency is not less than a preset percentage of an amplitude of the original frame in a corresponding frequency in the region from low-frequency region to intermediate-frequency.

9. The data processing method according to claim 8, wherein the decoding spectrum modulation corresponds to the encoding spectrum modulation, so that the amplitude of the decompressed frame in a region of intermediate-frequency is smoothly increased in comparison with the corresponding amplitude of the original frame in the region of intermediate-frequency.

10. The data processing method according to claim 9, wherein the decoding spectrum modulation corresponds to the encoding spectrum modulation, so that the amplitude of the decompressed frame in a region of low-frequency is smoothly increased in comparison with the corresponding amplitude of the original frame in the region of low-frequency, and the increase of the amplitude of the decompressed frame in the region of intermediate-frequency is greater than the increase of the amplitude of the decompressed frame in the region of low-frequency.

11. The data processing method according to claim 9, wherein the decoding spectrum modulation corresponds to the encoding spectrum modulation, so that the amplitude of the decompressed frame in a region of high-frequency is smoothly decreased in comparison with the corresponding amplitude of the original frame in the region of high-frequency.

12. The data processing method according to claim 8, wherein the performing of the data decompression on the compressed frame includes:

decoding the compressed frame based on the predictive data and the residual data to obtain a decoded frame, wherein the under-decompression-frame includes the decoded frame;

performing the decoding spectrum modulation on the decoded frame to obtain an adjustment frame; and performing a boundary adjustment on the adjustment frame to obtain the decompressed frame.

13. The data processing method according to claim 12, wherein the performing of the decoding spectrum modulation on the decoded frame includes:

determining a frame type of the decoded frame, wherein the frame type includes at least one of an intra predictive frame, a forward predictive frame, or a bidirectional predictive frame;

obtaining a decoding convolution kernel based on the frame type of the decoded frame to convolve the decoded frame; and obtaining the adjustment frame based on a convolution result, including:

obtaining a compensation frame based on the convolution result, wherein the compensation frame is a compensation for the decoded frame, and the compensation frame and the decoded frame are complementary to each other, and superimposing the compensation frame on the decoded frame to obtain the adjustment frame.

14. The data processing method according to claim 13, wherein when the decoded frame is the bidirectional predictive frame:

the decoding convolution kernel corresponding to the decoded frame is the same as a decoding convolution kernel corresponding to a reference frame with highest attenuation among closest adjacent reference frames in two directions, or the decoding convolution kernel corresponding to the decoded frame is an average value of decoding convolution kernels corresponding to closest adjacent reference frames in two directions.

15. The data processing method according to claim 12, wherein the performing of the boundary adjustment on the adjustment frame includes:

partitioning the adjustment frame based on element values of the adjustment frame, wherein the adjustment frame includes:

a pitted region including an element corresponding to a local minimum value, and a salient region including an element corresponding to a local maximum value;

obtaining a boundary value corresponding to each element in the pitted region and the salient region in the adjustment frame;

adjusting, based on a preset boundary threshold, an element whose boundary value is greater than the boundary threshold, in the pitted region and the salient region, to obtain an adjustment value; and adjusting the adjustment frame based on the adjustment value to obtain the decompressed frame.

16. The data processing method according to claim 15, wherein the boundary value includes a combination of a forward differential HADVD (Higher Absolute Differential Value Difference) and a backward differential HADVD of a current element; and a direction of the forward differential HADVD and the backward differential HADVD includes at least one of a vertical direction, a horizontal direction, or an oblique direction, and is the same as a convolution direction of the decoded frame.

17. The data processing method according to claim 15, wherein the combination of the forward differential HADVD and the backward differential HADVD of the current element includes:

a maximum weighted value, being a weighted value of a maximum value of the forward differential HADVD and the backward differential HADVD of the current element; or an absolute difference, being an absolute value of a difference between the forward differential HADVD and the backward differential HADVD of the current element.

18. The data processing method according to claim 15, wherein the adjusting, based on the preset boundary threshold, of the element whose boundary value is greater than the boundary threshold, in the pitted region and the salient region, to obtain the adjustment value includes:
- performing finite-order linear combining on a ratio of the boundary value corresponding to the element in the pitted region to the boundary threshold to obtain an adjustment value of the pitted region; and
- performing finite-order linear combining on a ratio of the boundary value corresponding to the element in the salient region to the boundary threshold, and negating a result of the finite-order linear combining to obtain an adjustment value of the salient region.

19. The data processing method according to claim 15, wherein the adjusting of the adjustment frame based on the adjustment value includes:
- superimposing the adjustment value on the element value corresponding to the adjustment frame.

20. The data processing method according to claim 15, further comprising, prior to the partitioning of the adjustment frame based on the element values of the adjustment frame:
- assigning values to elements whose element values are beyond a preset range in the adjustment frame, so that the elements are within the preset range, wherein the preset range includes a range defined by a first critical value and a second critical value, and the first critical value is greater than the second critical value, including:
  - assigning the first critical value to an element whose element value is greater than the first critical value in the adjustment frame, and
  - assigning the second critical value to an element whose element value is less than the second critical value in the adjustment frame.

* * * * *